United States Patent [19]
Byers et al.

[11] Patent Number: 5,784,393
[45] Date of Patent: Jul. 21, 1998

[54] METHOD AND APPARATUS FOR PROVIDING FAULT DETECTION TO A BUS WITHIN A COMPUTER SYSTEM

[75] Inventors: Larry L. Byers, Apple Valley; Gary R. Robeck, Albertville; Ronald W. Splett, Apple Valley, all of Minn.

[73] Assignee: Unisys Corporation, Blue Bell, Pa.

[21] Appl. No.: 396,680

[22] Filed: Mar. 1, 1995

[51] Int. Cl.$^6$ .................................................. G06F 11/10
[52] U.S. Cl. ........................ 371/49.1; 395/185.09
[58] Field of Search ........................ 371/20.5, 67.1, 371/68.1, 68.2, 71, 49.1; 395/182.13, 185.02, 185.09

[56] References Cited

U.S. PATENT DOCUMENTS

| | | | |
|---|---|---|---|
| 3,995,258 | 11/1976 | Barlow | 395/185.02 |
| 4,020,466 | 4/1977 | Cordi et al. | 340/172.5 |
| 4,084,231 | 4/1978 | Capozzi et al. | 364/200 |
| 4,298,929 | 11/1981 | Capozzi | 364/200 |
| 4,454,601 | 6/1984 | Helms et al. | 371/34 |
| 4,646,229 | 2/1987 | Boyle | 364/200 |
| 4,853,843 | 8/1989 | Ecklund | 364/200 |
| 4,998,069 | 3/1991 | Nguyen et al. | 324/539 |
| 5,032,979 | 7/1991 | Hecht et al. | 364/200 |
| 5,089,958 | 2/1992 | Horton et al. | 395/575 |
| 5,093,787 | 3/1992 | Simmons | 364/406 |
| 5,146,573 | 9/1992 | Sato et al. | 395/425 |
| 5,161,162 | 11/1992 | Watkins et al. | 395/183.19 |
| 5,202,969 | 4/1993 | Sato et al. | 395/425 |
| 5,222,224 | 6/1993 | Flynn et al. | 395/425 |
| 5,255,270 | 10/1993 | Yanai et al. | 371/10.2 |
| 5,307,484 | 4/1994 | Baker et al. | 395/600 |
| 5,351,243 | 9/1994 | Kalkunte et al. | 370/475 |
| 5,555,372 | 9/1996 | Tetreault et al. | 395/182.13 |

OTHER PUBLICATIONS

Kaunitz et al., "Audit Trail Compaction for Database Recovery", Communications of the ACM, vol. 27, No. 7, Jul. 1984.

Verhofstad, "Recovery Techniques for Database Systems", Computing Surveys, vol. 10, No. 2, Jun. 1978.

Gray et al., "The Recovery Manager of the System R Database Manager", Computing Surveys, vol. 13, No. 2, Jun. 1981.

Murray, "Resourceful debugger sifts through faults in IEEE-802.3 LANs", Electronic Design, Jan. 24, 1985, pp. 173-178, 180.

Spangenberg et al., "Views on a Network Analyzer", Byte, Jul. 1987, pp. 191-194, 196-198.

Primary Examiner—Stephen M. Baker
Attorney, Agent, or Firm—Nawrocki, Rooney & Sivertson, P.A.

[57] ABSTRACT

A method and apparatus for providing fault detection to a corresponding bus when one or more of the users connected to the bus does not have a fault detection capability provided therein. Further, the present invention may provide a method and apparatus for performing fault detection on a corresponding bus when the width of the bus is insufficient to accommodate a number of parity bits. In an exemplary embodiment, a selected one of the number of users may validate all bus transmissions via a number of transceivers, regardless of which user has a fault detection capability provided therein. In another exemplary embodiment of the present invention, a transmitting user may provide a data word and a number of corresponding parity bits. The transmitting user may provide the data word to the bus while storing the corresponding number of parity bits therein. The data word may be provided back to the transmitting user via the corresponding transceivers wherein the transmitting user may check the data word against the number of parity bits previously generated by the transmitting user.

36 Claims, 24 Drawing Sheets

| SIGNAL | SIGNAL DESCRIPTION |
|---|---|
| D(0-31) | DSD DATA BUS (I,O,Z) - BI-DIRECTIONAL MAIN DATA PATH FOR ALL OPERATIONS - ASSERTED BY BUS MASTER FOR WRITE OPERATIONS AND BY BUS SLAVE FOR READ OPERATIONS |
| DP(0-3) | DSD DATA BUS PARITY (I,O,Z) - DP0 = PARITY FOR D0-7. DP1 = PARITY FOR D8-15. DP2 = PARITY FOR D16-23. DP3 = PARITY FOR D24-31. |
| A(0-29) | DSD ADDRESS BUS (I,O,Z) - BI-DIRECTIONAL ADDRESS BUS FOR ALL DEVICES ATTACHED TO THE INTERFACE - ASSERTED BY THE BUS MASTER. |
| ADS/ | ADDRESS STATUS (I,O,Z) - WHEN ASSERTED BY THE BUS MASTER, THE CONTENTS OF THE ADDRESS BUS ARE VALID - DEFINES THE START OF A BUS CYCLE |
| W-R/ | WRITE/READ (I,O,Z) - INDICATES THE DIRECTION OF DATA TRANSFER RELATIVE TO THE BUS MASTER - DRIVEN BY THE BUS MASTER. WRITE=1, READ=0. |
| HOLD/ | HOLD (O) - ASSERTED BY DEVICE TO INDICATE THAT IT IS REQUESTING BUS MASTERSHIP |
| HLDAI/ | HOLD ACKNOWLEDGE (I) - ASSERTED BY BUS ARBITRATION LOGIC TO INDICATE THAT THE PREVIOUS BUS MASTER HAS RELINQUISHED USE OF THE BUS. |
| BCLK | BUS CLOCK (I) - CLOCK SIGNAL THAT CONTROLS THE DMA PORTION OF THE NCR53C720 |
| RESET/ | CHIP RESET (I) - FORCES A SYNCHRONOUS FULL CHIP RESET OF THE NCR53C720 - MUST BE ASSERTED FOR A MINIMUM OF 15 BUS CYCLES |
| CS/ | CHIP SELECT (I) - SELECTS THE NCR53C720 AS A SLAVE DEVICE - CONNECTED TO ADDRESS BIT 6 IN THE DSD APPLICATION |
| IRQ/ | INTERRUPT (O) - INDICATES THAT SERVICE IS REQUIRED FROM THE USBC |

FIG. 9A

| SIGNAL | SIGNAL DESCRIPTION |
|---|---|
| BE3/ | BYTE ENABLE THREE (I,O,Z) - ENABLES DATA TRANSFER ON DATA BUS LINES D0-D7 - ASSERTED BY BUS MASTER |
| BE2/ | BYTE ENABLE TWO (I,O,Z) - ENABLES DATA TRANSFER ON DATA BUS LINES D8-D15 - ASSERTED BY BUS MASTER |
| BE1/ | BYTE ENABLE ONE (I,O,Z) - ENABLES DATA TRANSFER ON DATA BUS LINES D16-D23 - ASSERTED BY BUS MASTER |
| BE0/ | BYTE ENABLE ZERO (I,O,Z) - ENABLES DATA TRANSFER ON DATA BUS LINES D24-D31 - ASSERTED BY BUS MASTER |
| READYI/ | READY-IN (I) - SIGNAL FROM SLAVE DEVICE TO BUS MASTER INDICATING THAT SLAVE IS READY TO TRANSFER DATA |
| READYO/ | READY-OUT (O) - ASSERTED TO INDICATE THE END OF A SLAVE MODE CYCLE - THE NCR53C720 PROVIDES THIS SIGNAL TO TERMINATE A SLAVE CYCLE |
| MASTER/ | MASTER STATUS (O) - ASSERTED BY THE NCR53C720 WHEN IT BECOMES THE MASTER |
| BS(2-0) | BUS MODE SELECT (I) - SELECTS THE BUS MODE (MOTOROLA OR INTEL) AND ADDRESSING MODE (BIT OR LITTLE ENDIAN) - IN THE DSD APPLICATION, BS(2-0) = "010" THEREBY SELECTING 80386DX LIKE (BUS MODE 4) AND BIG ENDIAN BUS MODE. |
| AUTO/ | SCRIPTS AUTOSTART MODE (I) - SELECTS EITHER AUTO OR MANUAL SCRIPTS START MODE. WHEN AUTO/=0, SCRIPTS STARTS AT ADDRESS-0 (ADDRESS IN DSP REGISTER OF NCR DEVICE) AUTOMATICALLY FOLLOWING A CHIP RESET. WHEN AUTO/=1, SCRIPTS STARTS AFTER THE DSP REGISTER HAS BEEN LOADED BY THE USBC. IN THE DSD APPLICATION, AUTO/ IS SET TO 1. |

FIG. 9B

METHOD AND APPARATUS FOR PROVIDING FAULT DETECTION TO A BUS WITHIN A COMPUTER SYSTEM

CROSS REFERENCE TO CO-PENDING APPLICATIONS

The present application is related to U.S. patent application Ser. No. 08/396,679, filed Mar. 1, 1995, now abandoned, entitled "Method and Apparatus For Storing Computer Data After a Power Failure", which is assigned to the assignee of the present invention and is incorporated herein by reference.

BACKGROUND OF THE INVENTION

1. Field of the Invention

The present invention generally relates to general purpose digital data processing systems and more particularly relates to such systems which provide fault detection to a bus therein.

2. Description of the Prior Art

A key design element of high reliability computer systems is that of error detection and correction. It has long been recognized that the integrity of the data bits within the computer system is critical to ensure the accuracy of operations performed in the data processing system. The alteration of a single data bit in a data word can dramatically affect arithmetic calculations or can change the meaning of a data word as interpreted by other sub-systems within the computer system.

One method for performing error detection is to associate an additional bit, called a "parity bit", along with the binary bits comprising a data word. The data word may comprise data, an instruction, an address, etc. Parity involves summing without carry the bits representing a "one" within a data word and providing an additional "parity bit" so that the total number of "ones" across the data word, including the added parity bit, is either odd or even. The term "Even Parity" refers to a parity mechanism which provides an even number of ones across the data word including the parity bit. Similarly, the term "Odd Parity" refers to a parity mechanism which provides an odd number of ones across the data word including the parity bit.

A typical system which uses parity as an error detection mechanism has a parity generation circuit for generating the parity bit. For example, when the system stores a data word into a memory, the parity generation circuit generates a parity bit from the data word and the system stores both the data word and the corresponding parity bit into an address location in the memory. When the system reads the address location where the data word is stored, both the data word and the corresponding parity bit are read from the memory. The parity generation circuit then regenerates the parity bit from the data bits read from the memory device and compares the regenerated parity bit with the parity bit that is stored in memory. If the regenerated parity bit and the original parity bit do not compare, an error is detected and the system is notified.

It is readily known that a single parity bit in conjunction with a multiple bit data word can detect a single bit error within the data word. However, it is also readily known that a single parity bit in conjunction with a multiple bit data word can be defeated by multiple errors within the data word. As calculation rates increase, circuit sizes decrease, and voltage levels of internal signals decrease, the likelihood of a multiple errors within a data word increase. Therefore, methods to detect multiple errors within a data word are essential. In response thereto, system designers have developed methods for detecting multiple errors within multiple bit data words by providing multiple parity bits for each multiple bit data word.

The above referenced error detection schemes may be used on various internal nodes of a computer system. That is, for high reliability computer systems, many of the data paths within the computer system may have an error detection scheme incorporated therein. One specific application which may utilize an error detection scheme is a bi-directional data bus. In a typical system, a number of bus users may be coupled to a bus wherein each of the number of bus users may interface with the bus via a number of bi-directional transceivers or the like. Each of the transceivers may comprise an output buffer and an input buffer. Each of the output buffers may have an input, an output, and an enable. Each of the input buffers may have an input and an output. The output of each output buffer may be coupled to a corresponding line of the bus. Further, the input of each input buffers may be coupled to the output of a corresponding output buffer, and thus to a corresponding line of the bus.

Each of the number of bus users may provide a data word to the inputs of the corresponding number of output buffers and may further control the enables of the corresponding number of output buffers. When a bus user becomes the transmitting user, the bus user may enable the corresponding number of output buffers such that the corresponding number of output buffers may drive the data word onto the bus. Because the inputs of the corresponding number of input buffers may be coupled to the bus, the number of input buffers may provide the actual bus value back into the transmitting user. That is, the transmitting user may provided a data word to the bus wherein the input buffers read the value of the bus and provide the value back to the transmitting user.

To avoid bus contention problems, only one bus user is allowed to drive the bus at any given time. A receiving user may read the bus whenever the bus is being driven by a transmitting user. Typically, the transmitting user provides a user address via a portion of the bus which may identify a selected subset of the users as receiving users. The user address, therefore, may identify which of the bus users is to receive the data driven onto the bus by the transmitting user.

In a typical fault detection scheme, the transmitting user may generate a number of parity bits for each data word provided by the transmitting user to the bus. A receiving user typically receives each data word and the number of parity bits provided by the transmitting user. A receiving user may then regenerate the number of parity bits based upon the data word received, and compares the regenerated parity bits with the parity bits generated by the transmitting user. If there is a difference, the receiving user may indicate a bus fault.

A limitation of the above referenced fault detection schemes is that both the transmitting user and the receiving user must have a fault detection capability provided therein. Further, the bus itself must have a number of extra lines to accommodate the transmission of the parity bits. This may present a problem when standard off-the-shelf parts are utilized within a system. System designers prefer to use standard off-the-shelf parts whenever possible because they are far less expensive than custom parts. A drawback of using standard off-the-shelf parts may be that an exact correspondence between the desired functionality and the functionality provided by the standard off-the-shelf part may not exist. For example, many standard off-the-shelf parts which interface with a bus do not have any fault detection capability at all or only have a limited fault detection capability provided therein. Further, even if a standard off-the-shelf part does have a fault detection capability, it may not be compatible with a desired fault detection scheme.

For the reasons given above, the use of standard off-the-shelf devices may limit the effectiveness of the fault detection schemes described above. That is, if a transmitting user is capable of generating parity bits and providing the parity bits to a bus, but a receiving user is not capable of regenerating the parity bits and making a comparison thereof, the above referenced fault detection schemes are essentially inoperable.

Under some circumstances, the use of standard off-the-shelf devices may cause some of the data transmissions across a bus to not be checked by prior art error detection schemes. For example, in a system having a processor and a memory wherein the processor is coupled to the memory via a bus, the processor may only check the parity of a read transmission. That is, when the processor writes data to the memory via the bus, the processor may not check the parity of the data on the bus. As stated above, in prior art error detection schemes, parity is only checked by the receiving user. However, typical off-the-shelf memories do not have a fault detection capability and therefore may not check the parity of a corresponding write transmission, as is required by prior art error detection schemes. Further, because the standard off-the-shelf memory may not have a fault detection capability, the width of a bus interface may not be capable of accommodating the additional parity bits. For example, the address bus interface may only be wide enough to accept the address bits but not additional parity bits.

Another exemplary situation where the width of a bus may not be sufficiently wide to accommodate additional parity bits may be when a fault detection scheme is introduced into an existing system. For example, a PC board of a computer system may be designed such that predefined integrated circuits or the like may be received thereby. A bus interconnecting the predefined integrated circuits may be formed by a number of metal traces on the PC board. It may be desirable to replace one or more of the integrated circuits with a corresponding integrated circuit which has a fault detection capability provided therein. However, to increase the width of the bus to accommodate a number of additional parity bits, a new PC board may have to be designed and manufactured, which may be relatively expensive. Under these circumstances, prior art fault detection schemes may not allow the fault detection capability provided on each of the integrated circuits to check for faults on the bus.

SUMMARY OF THE INVENTION

The present invention overcomes many of the disadvantages of the prior art by providing a method and apparatus for providing fault detection to a corresponding bus when one or more of the devices connected to the bus does not have a fault detection capability. Further, the present invention may provide a method and apparatus for performing fault detection on a corresponding bus when the width of the bus is insufficient to accommodate a number of parity bits.

In an exemplary embodiment of the present invention, a number of users may be coupled to a bus. Each of the number of users may have a number of transceivers for interfacing with the bus. Each of the number of transceivers may be in accordance with the description provided above. That is, each of the number of transceivers may have an output buffer and an input buffer wherein the output of the output buffer may be coupled to a corresponding bus line and may further be coupled to the input of the input buffer. When the output buffers of a transmitting user are driving the bus, the value of the data bits on the bus may be provided back into the transmitting user via the input buffers. The present invention may take advantage of these characteristics of the bus transceiver.

In one embodiment of the present invention, at least one of the users that is coupled to the bus may: (1) not have a fault detection capability at all; (2) may have only a limited fault detection capability; or (3) may have an incompatible fault detection capability with another one of the at least one users. A transmitting user may provide a data word and a number of corresponding parity bits to the bus via the output buffer. However, unlike the prior art fault detection schemes, the receiving user may not be capable of regenerating the parity bits and performing the compare function as described above. In the exemplary embodiment, the data word and the number of parity bits may be provided back into the transmitting user, via the input buffers of the transmitting user, wherein a parity check may be performed by the transmitting user. Since the input buffers of the transceivers are coupled directly to the bus, the exemplary embodiment may detect opens, shorts, stuck-at-faults, etc., on the bus. Further, the exemplary embodiment may provide continuous validation of the transceivers themselves and any supporting circuitry in the transmitting user when the transceivers are in the transmit mode.

The exemplary embodiment may have a number of other advantages. As stated above, some data transmissions across a bus may not be checked by prior art error detection schemes. The example given above was a system having a processor and a memory wherein the processor is coupled to the memory via a bus. The processor may only check the parity of a read transmission and not of a write transmission. As stated above, in prior art error detection schemes, parity is only checked by the receiving user. However, typical off-the-shelf memories do not have a fault detection capability and therefore may not check the parity of a corresponding write transmission, as is required by prior art error detection schemes.

An exemplary embodiment of the present invention may provide a central hardware element which may validate all bus transmissions, regardless of which user has a fault detection capability provided therein. That is, the transceivers of a selected one of the users may monitor all data transmissions on the bus, and check the parity thereof. Any transmission between any two or more users, including the selected one of the users, may be validated by the central hardware element. This may allow the exemplary embodiment to check the parity of otherwise un-checked data transmissions over the bus. It is contemplated that the central hardware element may be located in at least one of the users or may be provided in a separate element which is coupled to the bus. If the central hardware element is provided in a separate element which is coupled to the bus, the transceiver may comprise only an input buffer. The input buffer being necessary to monitor the bus transmissions. Finally, it is contemplated that the input buffers of a user may provide the value of the data word on the bus to the user such that a parity check may be performed by the user, regardless of whether the corresponding user is a transmitting user, a receiving user, or neither.

The centralization of the error detection function may help isolate where an error actually occurred. That is, since all bus transmission may be monitored regardless of which user is the transmitting user or the receiving user, the exemplary embodiment may determine which transmission provided the error therein. For the memory read/write example described above, the exemplary embodiment may check the parity of a data write transmission to a memory and a corresponding data read transmission from the memory. This may isolate the error to the transmitting user or to the memory. In prior art schemes, it may not be possible to determine which device may have caused the error.

In another embodiment of the present invention, the bus itself may not be sufficiently wide to accommodate a number of additional parity bits. For example, as described above, the receiving user may not have a fault detection capability provided therein, and therefore the bus interface of the receiving user may not be sufficiently wide to handle the additional parity bits provided by a transmitting user. In such a configuration, the bus may be only as wide as the receiving user's bus interface. In another example, a predesigned PC board having a fixed with bus may be upgraded to include a number of users having a fault detection capability. In this situation, it may be costly to redesign the PC board to include a wider bus to accommodate the additional parity bits.

In an exemplary embodiment of the present invention, a transmitting user may furnish a data word and a number of corresponding parity bits. The transmitting user may provide the data word to the input ports of the corresponding output buffers of the transmitting user's transceivers while the corresponding number of parity bits may remain within the transmitting user. The data word may then be driven onto the bus by the output buffer to a receiving user. As described above, the data word may be provided back to the transmitting user via the input buffer of the corresponding transceivers. The transmitting user may then check the data word received by the input buffer against the number of parity bits previously generated by the transmitting user and stored therein. In this way, the exemplary embodiment may detect opens, shorts, stuck-at-faults, etc., which may occur on the bus. Further, the exemplary embodiment may provide continuous validation of the transceivers themselves and any supporting circuitry in the transmitting user when the transceivers are in the transmit mode.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 9A–9B comprise a table illustrating an exemplary bus description of the DSD bus of FIG. 7;

DETAILED DESCRIPTION OF THE PREFERRED EMBODIMENTS

Figure 1:
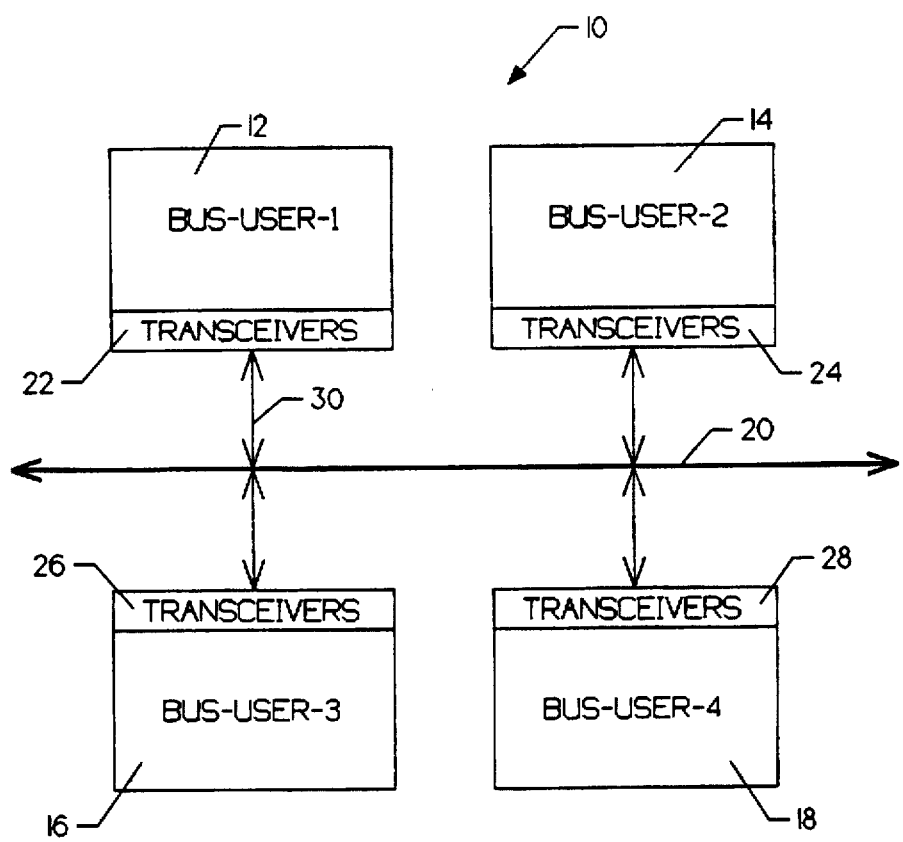
FIG. 1 is a block diagram of a number of users coupled to a bus via a number of transceiver blocks.

FIG. 1 is a block diagram of a number of users coupled to a bus via a number of transceiver blocks. The block diagram is generally shown at 10. In the exemplary embodiment, a first user 12 may be coupled to a bus 20 via interface 30. First user 12 may have a transceivers block 22 for providing an interface between bus 20 and first user 12. Similarly, a second user 14 may be coupled to bus 20 as shown. Second user 14 may have a transceiver block 24 for providing an interface between bus 20 and second user 14. A third user 16 may be coupled to bus 20 as shown. Third user 16 may have a transceiver block 26 for providing an interface between bus 20 and third user 16. Finally, a fourth user 18 may be coupled to bus 20 as shown. Fourth user 18 may have a transceivers block 28 for providing an interface between bus 20 and fourth user 18. Although four users are shown in FIG. 1, it is recognized that any number of users may be coupled to bus 20. Further, it is recognized that the number of users 12, 14, 16, and 18, may be processors, I/O interface devices, or any other device which may communicate over a bus.

Figure 2:
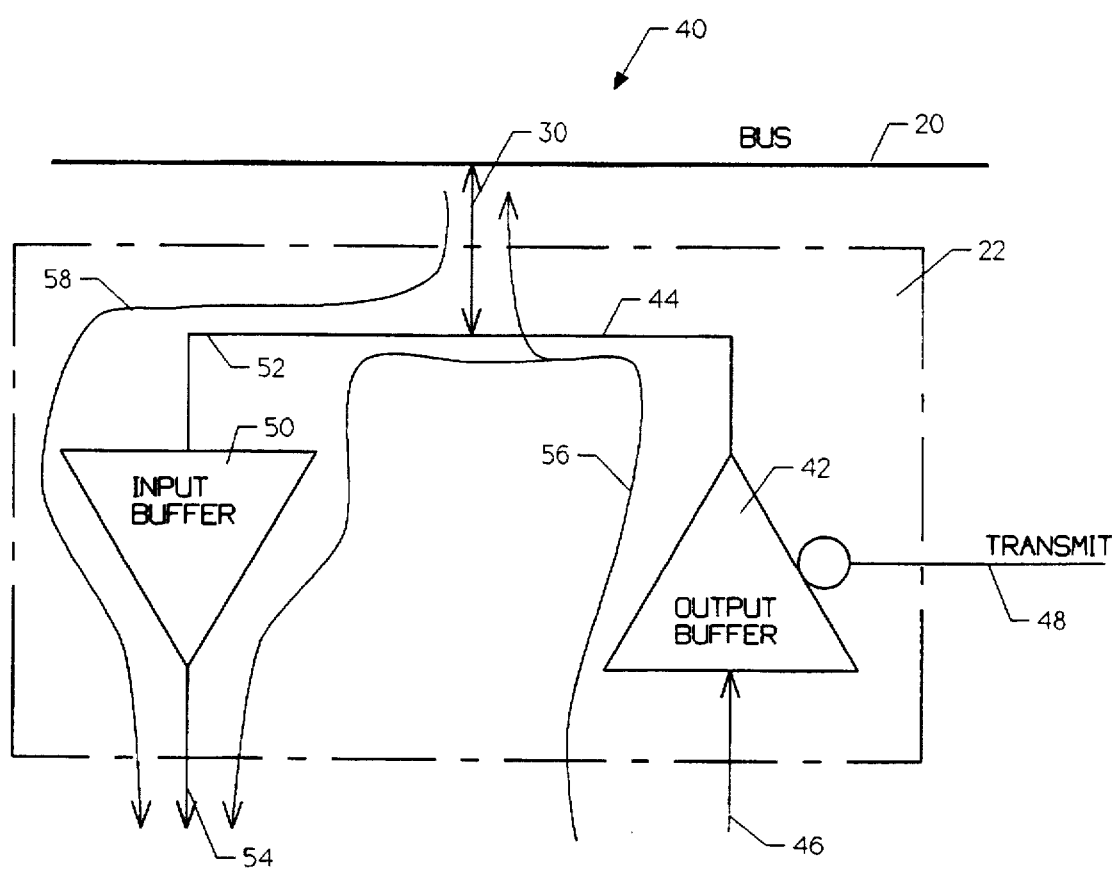
FIG. 2 is a schematic diagram showing the operation of one of the transceivers of FIG. 1.

Each of the transceiver blocks 22, 24, 26, and 28 may comprise a number of output buffers and input buffers (see FIG. 2). Each of the output buffers may have an input, an output, and an enable. Each of the input buffers may have an input and an output. The output of each output buffers may be coupled to a corresponding line of bus 20. Further, the input of each input buffers may be coupled to the output of a corresponding output buffer, and thus to a corresponding line of bus 20.

Each of the number of bus users 12, 14, 16, and 18 may provide a data word to the inputs of the corresponding number of output buffers and may further control the enables of the corresponding number of output buffers. When a bus user, for example user 12, becomes the transmitting user, user 12 may enable the corresponding number of output buffers such that the corresponding number of output buffers may drive the data word onto bus 20, and therefore to a receiving user. Because the inputs of the corresponding number of input buffers may be coupled the output port of a corresponding output buffer, and thus a corresponding line of bus 20 (see FIG. 2), the number of input buffers may provide the actual bus value back into transmitting user 12. That is, transmitting user 12 may provided a data word to bus 20 wherein the input buffers may read the value on bus 20 and provide the value back into transmitting user 12.

To avoid bus contention problems, only one of the number of bus users 12, 14, 16, and 18 may be allowed to drive the bus 20 at any given time. A receiving user, for example user 14, may read bus 20 whenever bus 20 is being driven by a transmitting user 12. Typically, a transmitting user 12 provides a user address via a portion of the bus 20 which may identify a selected subset of the number of users 14, 16, and 18 as receiving users. The user address, therefore, may identify which of the bus users 14, 16, and 18 is to receive the data being driven onto the bus by transmitting user 12.

FIG. 2 is a schematic diagram showing the operation of one of the transceivers of FIG. 1. The schematic diagram is generally shown at 40. As discussed above, each of the number of users 12, 14, 16, and 18 may have a corresponding transceiver block 22, 24, 26, and 28, respectively. The transceiver blocks 22, 24, 26, and 28 may be used for interfacing with bus 20. For clarity, FIG. 2 only shows a single transceiver within a transceiver block 22. However, it is contemplated that each transceiver block 22, 24, 26, and 28 may have a number of transceivers therein for interfacing with the number of bus lines of bus 20.

Each transceiver may have an output buffer 42 and an input buffer 50. Output buffer 42 may have an output port, an input port, and an enable port. User 12 may provide a data bit to the input port of output buffer 42 via interface 46. Further, user 12 may provide a transmit signal 48. When user 12 becomes a transmitting user, user 12 may provide a data bit to interface 46 and may further enable output buffer 42 via transmit signal 48. In response thereto, output buffer 42 may drive the data bit onto a corresponding line of bus 20 via interfaces 44 and 30, as shown by line 56.

Input buffer 50 may have an input port and an output port. The input port of input buffer 50 may be coupled to the output of output buffer 42 and may be further coupled to a corresponding line of bus 20 via interface 52. Input buffer 50 may provide the data on bus 20 to user 12 via interface 54, as shown by line 58. Although it is not shown in FIG. 2, it is contemplated that input buffer 50 may also have an enable signal which may be controlled by the corresponding bus user.

A unique feature of transceiver 22 is that when user 12 is a transmitting user, input buffer 50 may receive the data provided by output buffer 42 back into user 12, as shown by line 56. That is, because the input port of input buffers 50 may be coupled to bus 20, and thus may be coupled to the output port of output buffer 42, input buffer 50 may provide the actual bus value back into transmitting user 12. In this configuration, transmitting user 12 may provided a data bit to bus 20 wherein input buffer 50 may read the value on bus 20 and provide the value back to the transmitting user 12.

To avoid bus contention problems, only one of the number of bus users 12, 14, 16, and 18 may be allowed to drive the bus at any given time. A receiving user, on the other hand, may read the value on bus 20 whenever the bus is being driven by a transmitting user. Typically, the transmitting user provides a user address via a portion of the bus which may identify a selected subset of the users as receiving users. The user address, therefore, may identify which of the bus users 12, 14, 16, and 18 is to receive the data driven onto the bus by the transmitting user.

Figure 3:
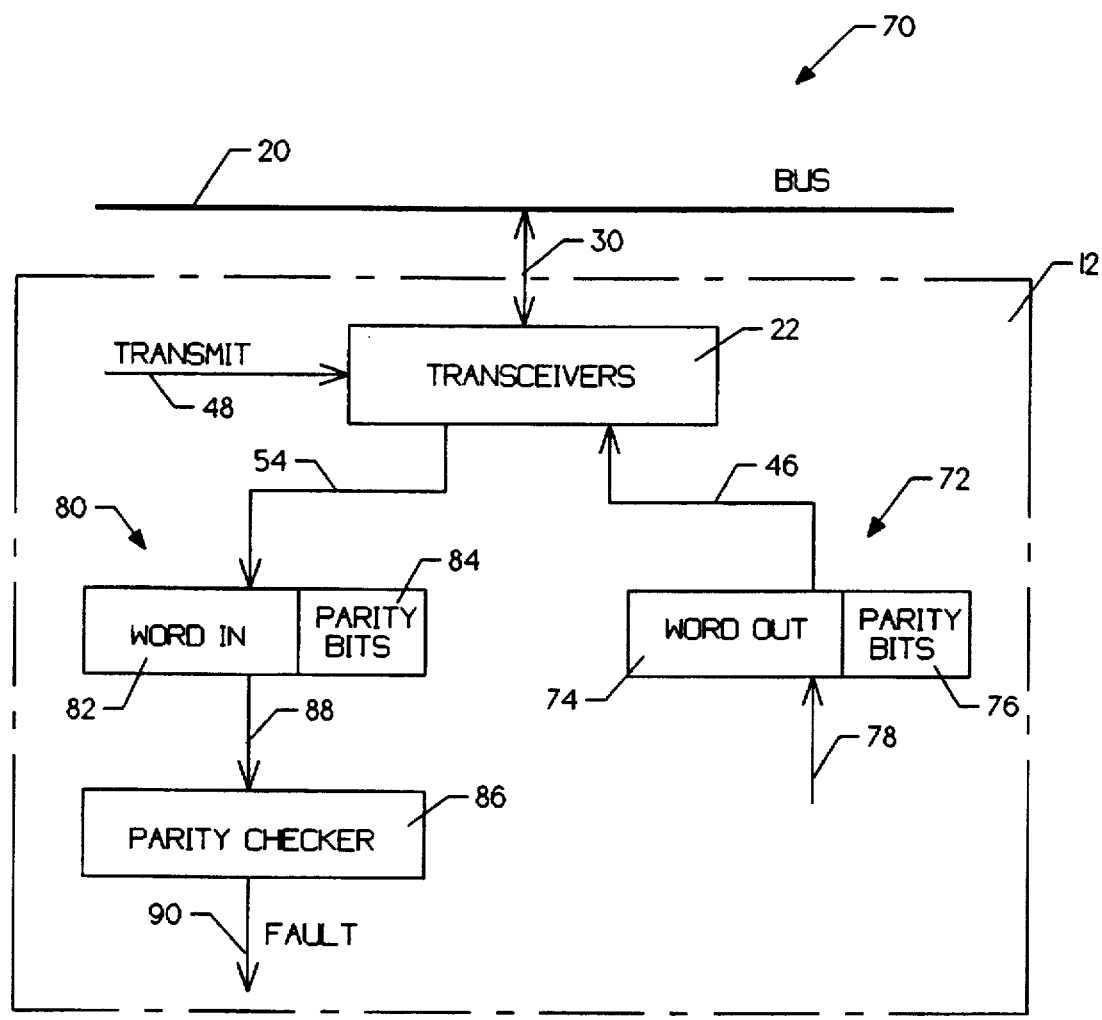
FIG. 3 is a block diagram of a first exemplary embodiment of the present invention.

FIG. 3 is a block diagram of a first exemplary embodiment of the present invention. The block diagram is generally shown at 70. The exemplary embodiment may provide fault detection to a bus 20 when one or more of the bus users 12, 14, 16, or 18 connected to bus 20 may not have a fault detection capability provided therein.

As discussed above, a number of users 12, 14, 16, or 18 may be coupled to bus 20. Each of the number of users 12, 14, 16, and 18 may have a number of transceivers 22, 24, 26, and 28, respectively, for interfacing with bus 20. Each of the number of transceivers 22, 24, 26, and 28 may be in accordance with the description provided above with reference to FIG. 2. That is, each of the number of transceivers 22, 24, 26, and 28 may have an output buffer and an input buffer wherein the output of the output buffer may be coupled to a corresponding bus line and may further be coupled to the input of the input buffer. When the output buffers of a transmitting user are driving bus 20, the value of the data bits on bus 20 may be provided back into the corresponding transmitting user via the input buffers. The present invention may take advantage of this characteristic of bus transceivers 22, 24, 26, and 28.

Referring specifically to FIG. 3, user 12 may be coupled to bus 20 via interface 30. Further, user 12 may have a transceiver block 22 for interfacing with bus 20. A data-out register 72 may be provided wherein the output of data-out register 72 may be coupled to transceiver block 22 via interface 46. User 12 may provide a data word 74 and a number of corresponding parity bits 76 to data-out register 72 via interface 78.

When user 12 becomes the transmitting user, user 12 may enable transceiver block 22 via interface 48, thereby placing transceiver block 22 into a transmit mode. Data word 74 and the number of corresponding parity bits 76 may be provided to bus 20 via transceiver block 22. This may result in a bus word on bus 20. As discussed above, the bus word and the number of corresponding parity bits may be provided back to user 12 via the input buffers of transceiver block 22. This may result in a check word on interface 54. The check word may be stored in a data-in register 80 as shown. The check word may comprise a data word 82 and a number of corresponding parity bits 84. The check word may then be provided to parity checker block 86 via interface 88. Parity checker block 86 may regenerate the parity bits for data word 82, and compare the regenerated parity bits with the number of corresponding parity bits 84. If a difference exists, parity checker 86 may provide a fault to user 12 via interface 90.

In the exemplary embodiment, at least one of the number of users 12, 14, 16, and 18 that is coupled to bus 20 may: (1) not have a fault detection capability at all; (2) may have only a limited fault detection capability; or (3) may have an incompatible fault detection capability with another one of the at least one users 12, 14, 16, or 18. In this configuration, a transmitting user 12 may provide a data word and a number of corresponding parity bits to bus 20 via the corresponding output buffers. However, unlike the prior art fault detections schemes, the receiving user may not be capable of regenerating the parity bits and performing the compare function as described above. In the exemplary embodiment, the data word and the number of parity bits may be provided back into the transmitting user, as discussed above, wherein a parity check may be performed by the transmitting user. Since the input buffers of the transceivers are coupled directly to bus 20, the exemplary embodiment may detect opens, shorts, stuck-at-faults, etc., on bus 20. Further, the exemplary embodiment may provide continuous validation of the corresponding transceiver 22 and any supporting circuitry, including data-out register 72, when transceiver 22 is in the transmit mode.

The exemplary embodiment may have a number of other advantages. As stated above, some data transmissions across bus 20 may not be checked by prior art error detection schemes. In one such example, user 16 may be a processor and user 14 may be a memory wherein the processor 16 may be coupled to the memory 14 via bus 20. The processor 16 may only check the parity of a read transmission and not of a write transmission. As stated above, in prior art error detection schemes, parity is only checked by the receiving user. However, typical off-the-shelf memories do not have a fault detection capability and therefore may not check the parity of a corresponding write transmission, as is required by prior art error detection schemes.

The exemplary embodiment of the present invention may provide a central hardware element which may validate all bus transmissions, regardless of which of the number of users 12, 14, 16, and 18 has a fault detection capability provided therein. That is, the transceivers of a selected one of the users may monitor all data transmissions on the bus, and check the parity thereof. This may be possible because the input buffers of transceiver block 22 may continuously monitor bus 20. A transmission between any two or more users, including the selected one of the users, may be validated by the central hardware element. This may allow the exemplary embodiment to check the parity of otherwise un-checked data transmissions over bus 20. It is contemplated that the central hardware element may be located in at least one of the users or may be provided in a separate element which is coupled to the bus. If the central hardware element is provided in a separate element which is coupled to bus 20, the corresponding transceivers may comprise only an input buffer. The input buffer being necessary to monitor the bus transmissions. Finally, it is contemplated that the input buffers of a user may provide the value of the data word on bus 20 to the selected user such that a parity check may be performed by the selected user, regardless of whether the selected user is a transmitting user, a receiving user, or neither.

To determined when one of the number of users is providing a data transmission over bus 20, the selected user may monitor a "busy" signal or equivalent on bus 20. That is, when one of the number of users is providing a data transmission over bus 20, the corresponding user may assert a "busy" signal on bus 20 to notify the other users that a bus transmission is occurring. The use of a "busy" signal is one method of preventing bus contention problems. Alternatively, it is contemplated that the selected user may receive predetermined control signals from the other users such that the selected user may determine when a bus transmission is occurring, thereby allowing the selected user to check the parity thereof.

The centralization of the error detection function may help isolate where an error actually occurred. That is, since all bus transmission may be monitored regardless of which user is the transmitting user or the receiving user, the exemplary embodiment may determine which user provided the error. For the memory read/write example described above, the exemplary embodiment may check the parity of a data write transmission to a memory and a corresponding data read transmission from the memory. This may isolate the error to the transmitting user or to the memory. In prior art schemes, it may not be possible to determine which device may have caused the error.

Figure 4:
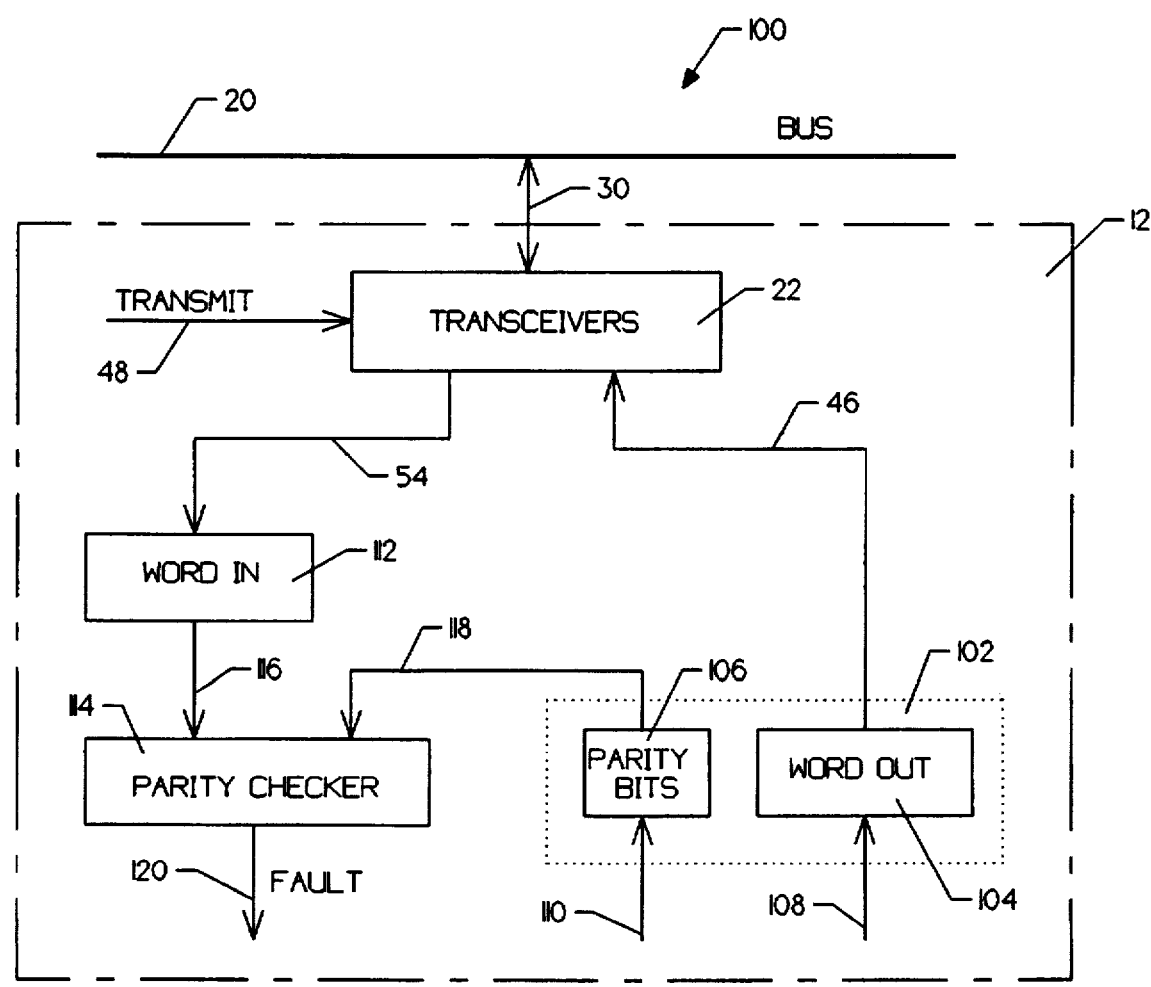
FIG. 4 is a block diagram of a second exemplary embodiment of the present invention.

FIG. 4 is a block diagram of a second exemplary embodiment of the present invention. The block diagram is generally shown at 100. In this embodiment, bus 20 may not be sufficiently wide to accommodate a number of additional parity bits. For example, as described above, a receiving user may not have a fault detection capability provided therein, and therefore the bus interface of the receiving user may not be sufficiently wide to handle the additional parity bits provided by a transmitting user. In such a configuration, bus 20 may be only as wide as the receiving user's bus interface. In another example, a predesigned PC board having a fixed width bus 20 may be upgraded to include a number of users having a fault detection capability. In this situation, it may be costly to redesign the PC board to include a wider bus to accommodate the additional parity bits.

In the exemplary embodiment, a transmitting user 12 may provide a data word 104 and a number of corresponding parity bits 106. Transmitting user 12 may provide data word 104 and the corresponding parity bits 106 to a data-out register 102 via interfaces 108 and 110, respectively. Data-out register 102 may provide data word 104 to the input ports of the corresponding output buffers of transceiver block 22 via interface 46, while the corresponding number of parity bits 106 may be stored within transmitting user 12. Transmitting user 12 may then place the corresponding transceiver block 22 into a transmit mode via interrace 48, wherein data word 104 may be driven onto bus 20 to a receiving user, thereby resulting in a bus word.

As described above, the bus word may be provided back into transmitting user 12 via the input buffers of the corresponding transceiver block 22. The bus word may be provided to a data-in register 112 via interface 54, thereby resulting in a check word. Transmitting user 12 may then provide the check word to a parity checker block 114 via interface 116. Further, previously generated parity bits 106 may be provided to parity checker block 114 via interface 118. Parity checker block 114 may regenerate a number of parity bits for the check word and compare the regenerated number of parity bits with the number of parity bits 106 previously generated by transmitting user 12 and stored therein. If the regenerated parity bits do not compare with the previously generated parity bits 106, parity checker block 114 may provide a fault to transmitting user 12 via interface 120. In this way, the exemplary embodiment may detect opens, shorts, stuck-at-faults, etc., which may occur on bus 20. Further, the exemplary embodiment may provide continuous validation of the transceiver block 22 and any supporting circuitry within transmitting user 12, including the data-out register 102 and the data-in register 112, when the transmitting user 12 is in the transmit mode.

Figure 5:
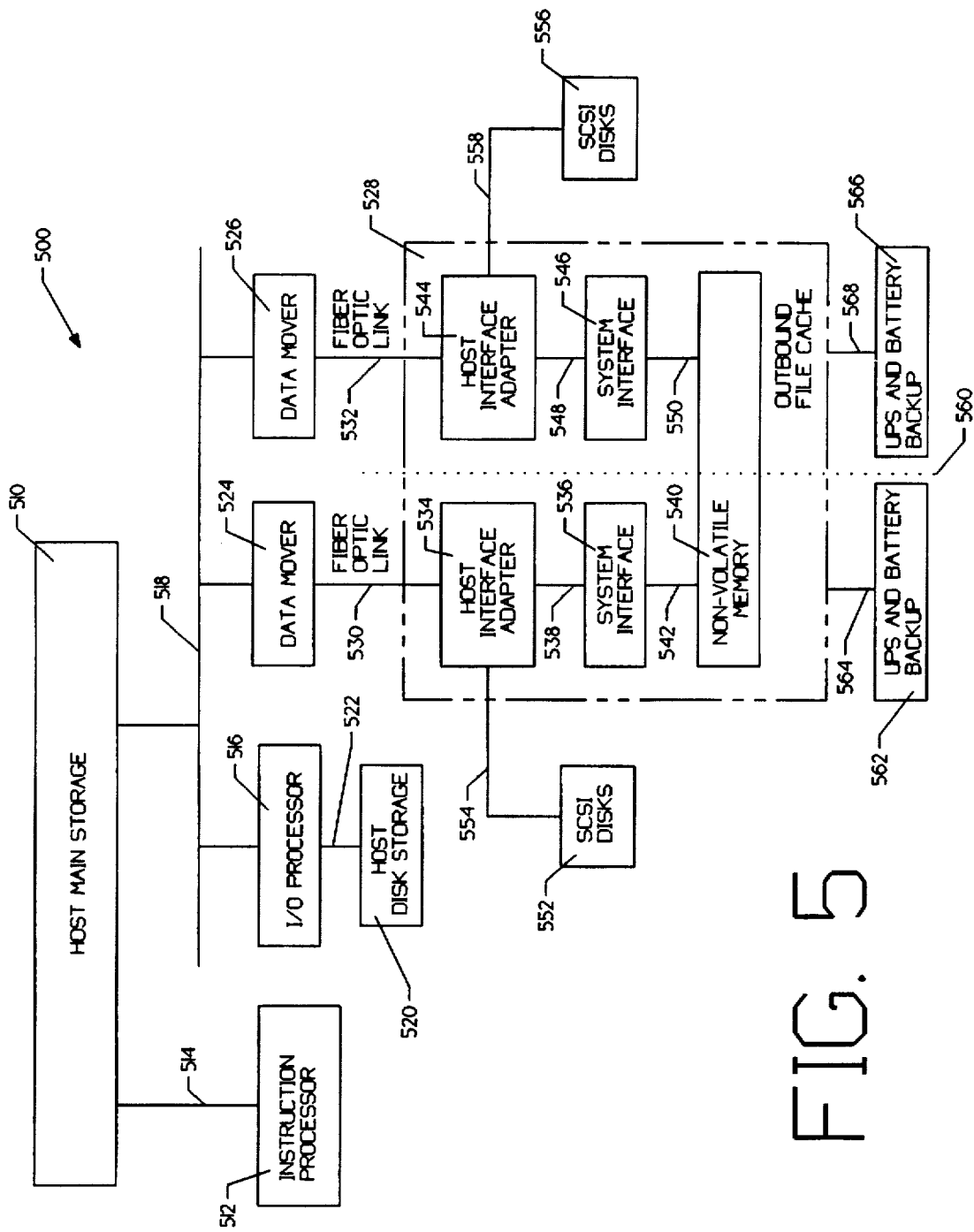
FIG. 5 is a block diagram of an exemplary computer system which may incorporate the present invention.

FIG. 5 is a block diagram of an exemplary computer system which may incorporate the present invention. The block diagram is generally shown at 500. The XPC comprises an instruction processor 512, an IO processor 516, a host disk storage 520, an outbound File Cache block 528, and a host main storage 510. Instruction processor 512 receives instructions from host main storage 510 via interface 514. Host main storage 510 is also coupled to MBUS 518. I/O processor 516 is coupled to MBUS 518 and is further coupled to host disk storage 520 via interface 522. In the exemplary embodiment, outbound File Cache block 528 is coupled to MBUS 518 through a first data mover 524 and a second data mover 526. Outbound File Cache block 528 may comprise two separate power domains including a power domain-A powered by a universal power source (UPS) and battery backup power source 562 via interface 564, and a power domain-B powered by a UPS power source and battery backup power source 566 via interface 568. The separation of power domain-A and power domain-B is indicated by line 560. UPS and battery backup blocks 562 and 566 may have a detection means therein to detect when a corresponding primary power source fails or becomes otherwise degradated.

Power domain-A of outbound file cache 528 may comprise a host interface adapter 534, a system interface block 536, and a portion of a nonvolatile memory 540. Host interface adapter 534 may be coupled to data mover 524 via fiber optic link 530 and may further be coupled to system interface block 536 via interface 538. System interface block 536 may be coupled to nonvolatile memory 540 via interface 542, as described above. Similarly, host interface adapter 544 may be coupled to data mover 526 via fiber optic link 532 and may further be coupled to system interface block 546 via interface 548. System interface block 546 may be coupled to nonvolatile memory 540 via interface 550, as described above.

The data may be transferred from the host disk storage 520 through I/O processor 516 to host main storage 510. But now, any updates that occur in the data are stored in nonvolatile memory 540 instead of host disk storage 520, at least momentarily. All future references then access the data in nonvolatile memory 540. Therefore, nonvolatile memory 540 acts like a cache for host disk storage 520 and may significantly increases data access speed. Only after the data is no longer needed by the system is it transferred back to host disk storage 520. Data movers 524 and 526 are used to transmit data from the host main storage 510 to the nonvolatile memory 540 and vice versa. In the exemplary embodiment, data movers 524 and 526 perform identical cache functions thereby increasing the reliability of the overall system. A more detailed discussion of the XPC system may be found in the above reference co-pending application, which has been incorporated herein by reference.

In accordance with the present invention, a data save disk system 552 may be coupled to host interface adapter 534 via interface 554. Similarly, data save disk system 556 may be coupled to host interface adapter 544 via interface 558. Data save disk systems 552 and 556 may comprise SCSI type disk drives and host interface adapters 534 and 544, respectively, may provide a SCSI interface thereto. In this configuration, the data elements stored in nonvolatile memory 540 may be downloaded directly to the data save disk systems 552 and 556. This may permit computer system 500 to detect a power failure in a power domain, switch to a corresponding backup power source 562 or 566, and store all of the critical data elements stored in nonvolatile memory 540 on SCSI disk drives 552 or 556 before the corresponding backup power source 562 or 566 also fails.

The primary power sources may comprise a universal power source (UPS) available from the assignee of the present invention. The backup power sources may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a corresponding data save disk system 552 or 556 as expediently as possible.

In the exemplary embodiment, backup power source 562 may only power a first portion of nonvolatile memory 540, host interface adapter 534, system interface 536, and data save disk system 552. Similarly, backup power source 566 may only power a second portion of nonvolatile memory 540, host interface adapter 544, system interface 546, and data save disk system 556. In this configuration, the remainder of computer system 500, including instruction processor 512, I/O processor 516, host main storage 510, and host disk storage 520, may not be powered after the primary power source fails. This may allow backup power sources 562 and 566 to remain active for a significantly longer period of time thereby allowing more data to be downloaded from nonvolatile memory 540. In this embodiment, host interface adapters 534 and 544 may have circuitry to support the downloading of the critical data elements to the SCSI disk drives 552 and 556, without requiring any intervention by instruction processor 512 or I/O processor 516.

Coupling data save disk systems 552 and 556 directly to host interface adapters 534 and 544, respectively, rather than to instruction processor 512 or I/O processor 516 may have significant advantages. As indicated above, it may be faster to download the data elements directly from nonvolatile memory 540 to data save disk systems 552 or 556, rather than providing all of the data to I/O processor 516 and then to host disk storage 520. Further, significant power savings may be realized by powering only the blocks in outbound file cache 528 and the corresponding data save disk systems 552 or 556, thereby allowing more data to be downloaded before a corresponding backup power source 562 or 566 fails. Finally, data save disk systems 552 and 556 may be dedicated to storing the data elements in nonvolatile memory 540 and thus may be appropriately sized.

In a preferred mode, once the data save operation has begun, it continues until all of the data in nonvolatile memory 540 has been transferred to the data save disk system. Thereafter, the data save disks are spun down and the outbound file cache 528 is powered down to minimize further drain on the battery backup power source. If the primary power source comes back on during the data save operation, the data save is still completed, but the outbound file cache 528 is not powered down. When primary power is restored, the operation of computer system 500 may be resumed beginning with a data restore operation, but only after the battery backup power source has been recharged to a level which could sustain another primary power source failure.

The data restore operation occurs after normal computer system 500 initialization, including power-up, firmware load, etc. However, before a data restore operation is allowed to begin, the presence of saved data on a corresponding data save disk must be detected. Prior to initiating the data restore operation, the USBC microcode (see FIG. 6) compares the present computer system 500 configuration with the configuration that was present when the data save operation was executed. If the two configurations are not an exact match, the data restore operation is not executed and an error is indicated.

A data save disk set may be added to the outbound file cache 528 as a single or redundant configuration. A single data save set may save one copy of the nonvolatile memory 540 contents, and is used when there is only one Universal Power Source (UPS) 562 driving the outbound file cache 528 and data save disks. A redundant data save disk configuration may have two data save disk sets (as shown in FIG. 5) and may save two copies of the nonvolatile memory contents. In the redundant configuration, one set of data save disk drives may be powered from one UPS while the another set of data save disk drives may be powered by another UPS.

Figure 6:
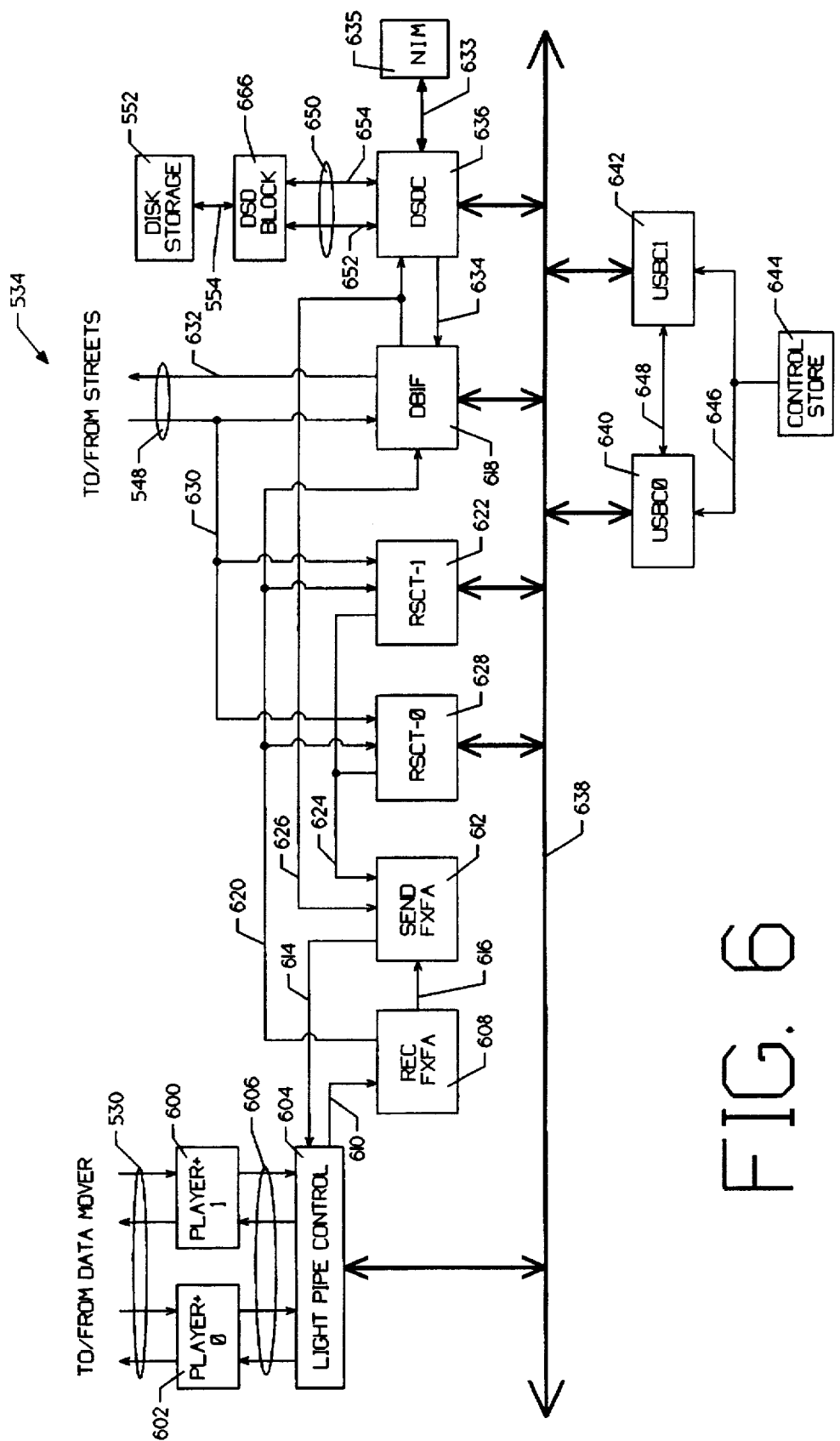
FIG. 6 is a schematic diagram of an exemplary embodiment of the host interface adapter block.

FIG. 6 is a schematic diagram of an exemplary embodiment of the host interface adapter block. For illustration, Host Interface Adapter (HIA) 534 of FIG. 5 is shown. It is recognized that HIA 544 may be similarly constructed. HIA 534 may comprise two Microsequencer Bus Controllers (USBC) 640, 642 which may be connected to a control store 644 via interface 646. The USBC's 640, 642 may access the HIA stations 628, 622, 618, and 636 via a micro bus 638. A player+0 602 and a player+1 600 may receive frames (or data elements) over fiber optic link 530. The term player+ refers to a fiber optic interface controller available from National Semiconductor which is called the Player Plus Chip Set. Player+0 602 may forward its frame to light pipe control 604 via interface 606. Similarly, player+1 600 may forward its frame to light pipe control 604 via interface 606. Light pipe control 604 may transfer the frames to a Receive Frame Transfer Facility (REC FXFA) 608 via interface 610. REC FXFA 608 may unpack the frames and may store control information in a Request Status Control Table-0 (RSCT-0) 628 and a RSCT-1 622 via interface 620. RSCT-0 628 and RSCT-1 622 may monitor the data that has been received from a corresponding data mover. The data which was contained in the frame received by REC FXFA 608 may be sent to the Database Interface (DBIF) station 618 via interface 620. DBIF 618 may forward the data over interface 632 to the streets.

Data received by the DBIF 618 from the streets via interface 548, may be sent to the Send Frame Transfer Facility (SEND FXFA) 612 via interface 626. Control information received via interface 630 may be sent to RSCT-0 628 and RSCT-1 622. SEND FXFA 612 may take the data and the control information provided by RSCT-0 628 and RSCT-1 622 via interface 624, and format a frame for transmission by light pipe control 604. Acknowledgements from REC FXFA 608 may be provided to SEND FXFA 612 via interface 616. The frame may be forwarded to light pipe control 604 via interface 614. Light pipe control 604 may create two copies of the frame received by SEND FXFA 612, and may provided a first copy to player+0 602 and a second copy to player+1 600 via interface 606. The frames may then be transmitted over the fiber optic links 530 to a corresponding data mover.

Referring back to control store 644, control store 644 may be used to store the instructions that are executed by USBC0 640 and USBC1 642. Control store 644, although in reality a RAM, is used as a read-only memory (ROM) during normal operation. Control store 644 may comprise seven (7) SRAM devices (not shown). Each SRAM device may hold 32*1024 (K) 8-bit bytes of data. Each unit of data stored in control store 644 may comprise 44 bits of instruction, 8 bits of parity for the instruction, and 2 bits of address parity.

Control store 644 may be loaded with instructions at system initialization by a support computer system through a maintenance path (not shown). The parity bits and address bits are computed by a host computer system and appended to each instruction as it is stored. Later, as USBC0 640 and USBC1 642 read and execute the instructions, each instruction is fetched from control store 644 and parity values are computed from it. Each USBC compares the parity values computed against the parity checks stored in control store 644. If there are any discrepancies, control store 644 is assumed to be corrupted and an internal check condition is raised in the corresponding USBC's.

USBC0 640 and USBC1 642 are special purpose microprocessors that execute instructions to monitor and control the transfer of data on micro bus 638. There are two USBC's in the system to ensure that all data manipulations are verified with duplex checking. One of the USBC's 640 is considered to be the master while the other USBC1 642 is considered the slave. Only the master USBC0 640 drives the data on the micro bus 638, but both master USBC0 640 and slave USBC1 642 drive address and control signals to lower the loading on micro bus 638. The slave USBC1 642 may send the result of each instruction to the master USBC0 640 via interface 648. The master USBC0 640 may then compare this value to the result it computed. If the values are different, an internal check error condition is set and the program is aborted. A further discussion of the operation of HIA 534 may be found in the above referenced co-pending application, which is incorporated herein by reference.

In accordance with the present invention, a data save disk controller (DSDC) 636 may be coupled to micro bus 638 and may thus communicate with USBC0 640 and USBC1 642. DSDC 636 is further coupled to DBIF 618 via interfaces 634 and 626. DSDC may receive data elements from DBIF 618 via interface 626 and may provide data elements to DBIF 618 via interface 634. DSDC 636 is further coupled to a DSD block 666 via a DSD bus 650. In the exemplary embodiment, DSDC 636 may be coupled to DSD block 666 via a DSD address bus 652, a DSD data bus 654, and a number of control signals. DSD block 666 may be coupled to a data save disk system 552 via interface 554. DSD block may provide the interface function between DSDC 636 and data save disk system 552. A network interface module (NIM) 635 may be coupled to DSDC 636 via interface 633. NIM 635 may provide maintenance functions to DSDC 636, and to other elements within the system. USBC0 640 and USBC1 642 may control the operation of a download and/or upload operation between a nonvolatile memory 540 and data save disk system 552. This may include providing a timer function to delay the download and/or upload operation for a predetermined time period.

In this configuration, data save disk system 552 is directly coupled to nonvolatile memory 540 via DSD block 666, DSDC 636, DBIF 618, and system interface 536 (see FIG. 5). When a primary power source fails, the data elements stored in nonvolatile memory 540 may be downloaded directly to the data save disk system 552 without any intervention by an instruction processor 512 or I/O processor 516. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, data save disk system 552, system interface 536, and non-volatile memory 540 need to be powered by the secondary power source to effect the download operation. This may significantly increase the amount of time that the secondary power source may power the system thereby increasing the number of data elements that can be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 516. This may provide a high speed upload link between data save disk system 552 and nonvolatile memory 540.

Figure 7:
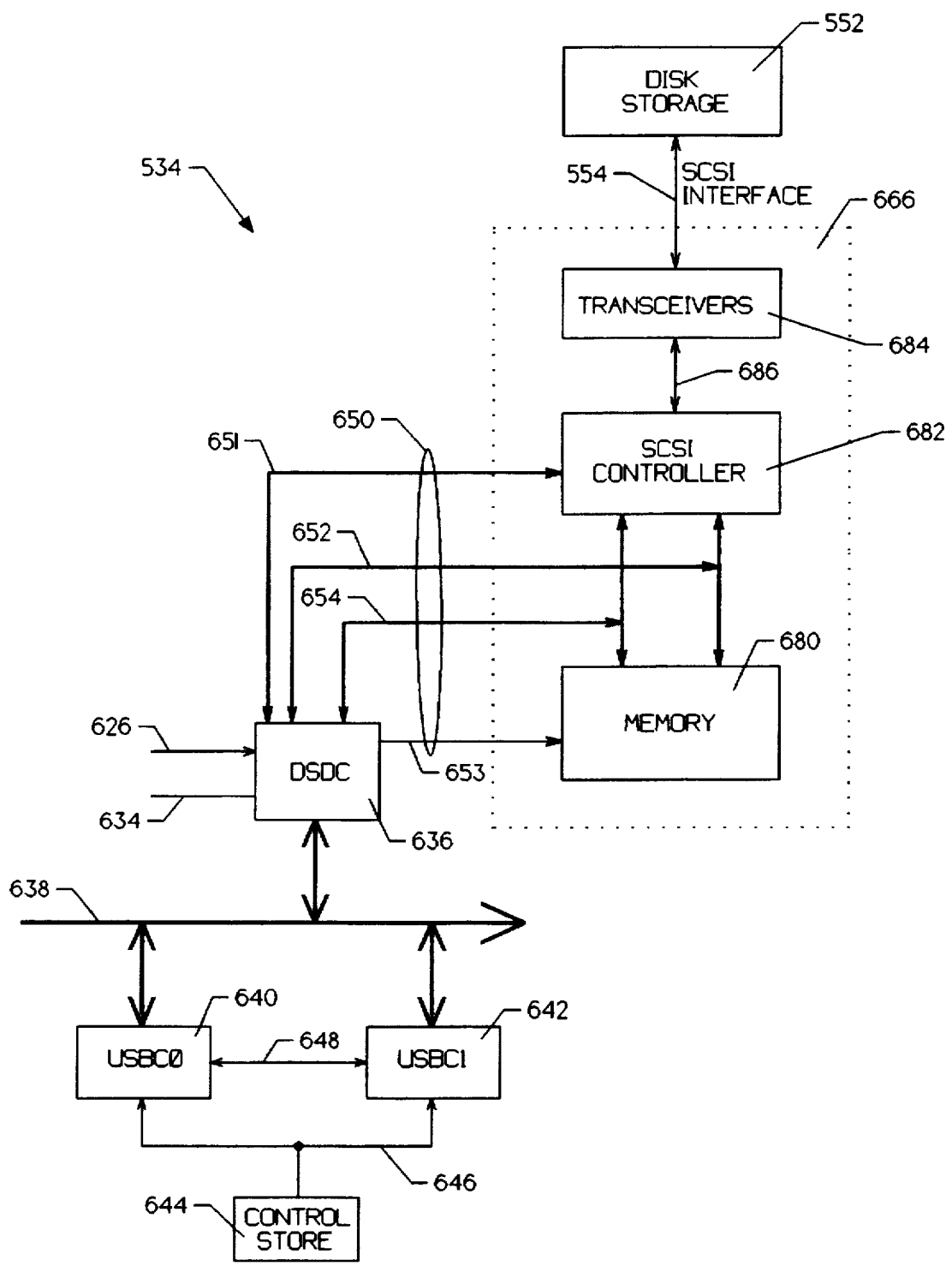
FIG. 7 is a partial schematic diagram of the host interface adapter block detailing the data save disk interface.

FIG. 7 is a partial schematic diagram of the host interface adapter block detailing the data save disk interface. DSD block 666 may comprise a memory 680, a disk controller 682, and a set of transceivers 684. A DSD bus 650 may couple DSDC 636, memory 680, and disk controller 682, and may comprise an address bus 652, and a data bus 654. DSD bus 650 may further comprise a number of disk controller control signals 651, and a number of memory control signals 653. DSD bus 650 may operate generally in accordance with a standard master/slave bus protocol wherein the DSDC 636, disk controller 682, and memory 680 may be slave devices, but only DSDC 636 and disk controller 682 may be master devices. That is, memory 680 may not be a master device in the exemplary embodiment.

Disk controller 682 may be coupled to transceivers 684 via interface 686. Transceivers 684 may be coupled to data save disk system 552 via interface 554. In a preferred mode, interface 554 may be a SCSI interface. Disk controller 682 may be a SCSI disk controller and data save disk storage system 552 may comprise at least one SCSI disk drive. In a preferred embodiment, disk controller 682 may be a NCR53C720 SCSI I/O Processor currently available from NCR corporation. Further, the at least one SCSI disk drives of data save disk storage 552 may comprise Hewlett Packard C3010 5.25" drives, Fijitsu M2654 5.25" drives, or Seagate ST12550/ND 3.5" drives. The data save disk system may comprise a set of 2-GByte SCSI Disks in sufficient quantity to store a single copy of the entire contents of the XPC. The NCR I/O processor may provide the necessary SCSI interface between DSDC 636 and the at least one disk drives of data save disk system 552.

As indicated with reference to FIG. 6, USBC0 640 and USBC1 642 may be coupled to MBUS 638. Further, USBC0 640 and USBC1 642 may be coupled to control store 644 via interface 646. DSDC 636 may be coupled to micro bus 638, DBIF 618, and DSD block 666. Memory 680 may comprise at least one RAM device. In a preferred mode, memory 680 comprises four RAM devices. Because the disk storage system is an addition to an existing HIA design, control store 644 may not have enough memory locations to store the added pointers and temporary data needed to support the data save disk function. Therefore, a primary function of memory 680 is to store the pointers and temporary data for USBC0 640 and USBC1 642 such that HIA 534 may support the disk data save function. Another primary function of memory 680 is to store SCRIPTS for disk controller 682. SCRIPT programs and the application thereof are discussed in more detail below. Additions to the USBC microcode which may be stored in memory 680 may provide the following functionality: (1) initialization of the data save disk system 552 and microcode control areas; (2) data save operation which may copy all of the data and control elements from nonvolatile memory 540 to data save disk system 552; (3) data restore operation which may copy all of the data and control elements from data save disk system 552 to nonvolatile memory 540; (4) checking the status of the disks in data save disk storage system 552 and informing maintenance if restore data exists thereon; and (5) various error detection and error handling subroutines.

As indicated above, USBC0 640 and USBC1 642 may read pointers and/or temporary data or the like from memory 680 through DSDC 636. To accomplish this, USBC0 640 and USBC1 642 may provide an address to DSDC 636 wherein DSDC 636 may arbitrate and obtain control of DSD bus 650. Once this has occurred, DSDC 636 may provide the address to memory 680. Memory 680 may then read the corresponding address location and provide the contents thereof back to DSDC 636 via DSD bus 650. DSDC 636 may then provide the pointers and/or temporary data or the like to USBC0 640 and USBC1 642 for processing. By using this protocol, USBC0 640 and USBC1 642 may obtain pointers and/or temporary data from memory 680 to control the operation of a download and/or upload operation between nonvolatile memory 540 and data save disk system 552. This may include providing a timer function to delay the download and/or upload operation for a predetermined time period.

Data save disk system 552 is directly coupled to nonvolatile memory 540 via DSD block 666, DSDC 636, DBIF 618, and system interface 536 (see FIG. 5). When a primary power source fails, and under the control of USBC0 640 and USBC1 642, DBIF 618 may read the data elements from nonvolatile memory via interface 630 wherein DBIF 618 may provide the data elements to DSDC 636 via interface 626. DSDC 636 may then perform arbitration for DSD bus 650, wherein the data elements may be read by disk controller 682. In this instance, disk controller 682 may be the bus master. Disk controller 682 may then provide the data elements to transceivers 684 wherein the data elements may be written to data save disk system 552. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, system interface 536, non-volatile memory 540, and data save disk system 552 need to be powered by the secondary power source to effect the download operation. This may significantly increase the amount of time that the secondary power source may power the system thereby increasing the number of data elements that may be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 514. This may provide a high speed upload link between data save disk system 552 and nonvolatile memory 540.

Figure 8A:
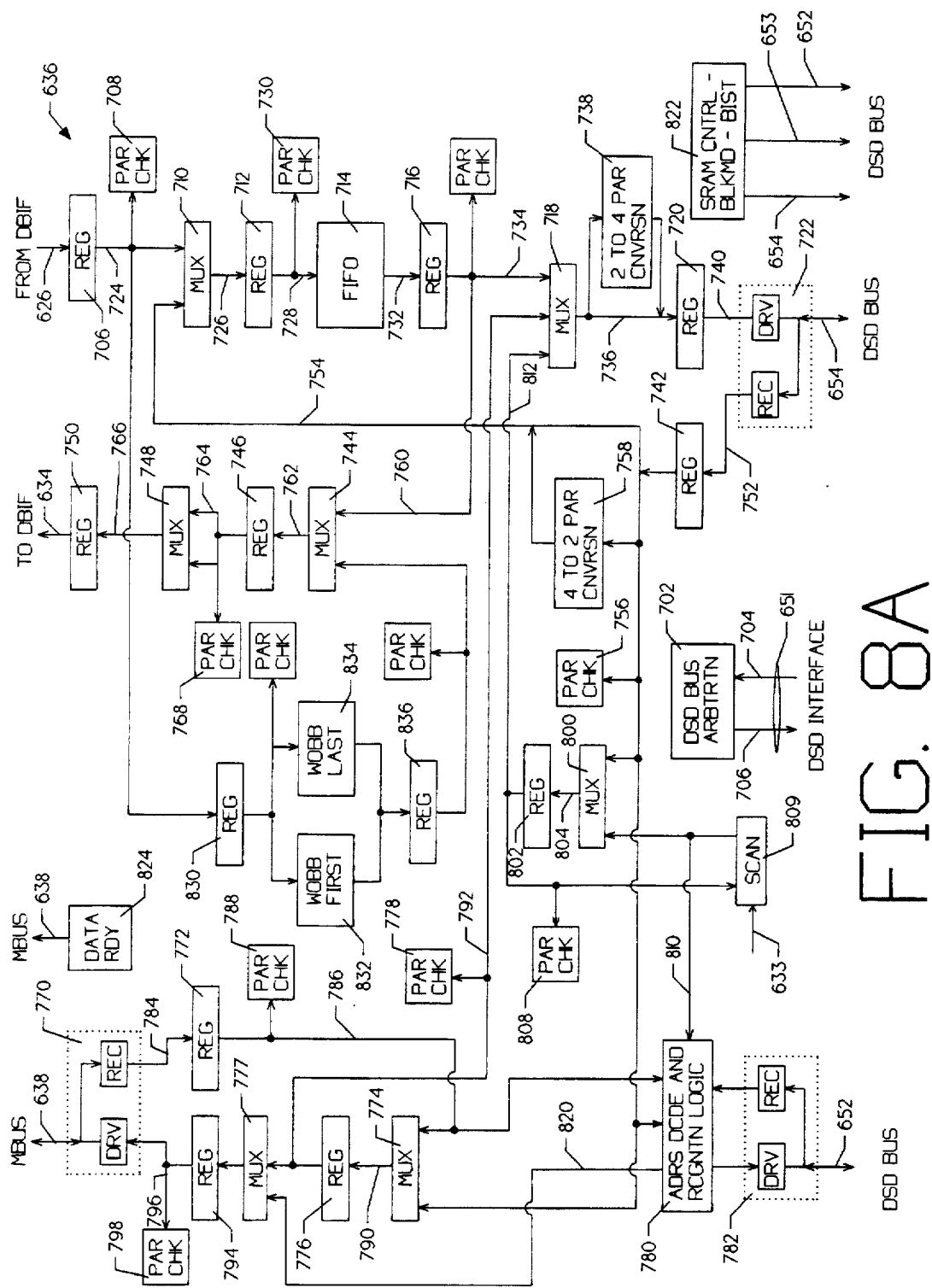
FIG. 8A is a block diagram of the Data Save Disk Chip (DSDC) shown in FIGS. 6–7.

FIG. 8A is a block diagram of the Data Save Disk Chip (DSDC) shown in FIGS. 6–7. The block diagram is generally shown at 636. DSDC 636 may comprise a DSD bus arbitration and control block 702 which may control the arbitration of DSD bus 650. DSD bus arbitration and control 702 may determine which device may assume the role of bus master of DSD bus 650. Preemptive priority is used to determine which device becomes bus master when more than one device is requesting bus mastership at any given time. In the exemplary embodiment, the priority order of bus mastership, from high priority to low priority, may be as follows: disk controller 682, USBC blocks 640, 642, and finally network interface module (NIM) 635. Memory 680 is not allowed to assume bus mastership of DSD bus 650 in the exemplary embodiment. DSD bus arbitration and control block 702, may be coupled to disk controller 682 via interface 651 (see FIG. 7). Interfaces 704 may be a bus request from disk controller 682 and interface 706 may be a bus acknowledge signal to disk controller 682.

In an exemplary embodiment, when disk controller 682 assumes bus mastership, it may relinquish bus ownership after a maximum of 16 bus cycles. Disk controller 682 may then wait 5 clock cycles before asserting a bus request to regain bus mastership. The 5 clock cycles provides a "fairness" delay to allow DSDC 636 to gain bus mastership if required.

DSDC 636 may comprise at least four basic data paths. A first basic data path may provide an interface between DBIF 618 and DSD bus 650. This path may comprise a register 706, a multiplexer 710, a register 712, a FIFO block 714, a register 716, a multiplexer 718, a data-out-register 720, and an I/O buffer block 722. Register 706 may receive data elements from DBIF 618 via interface 626. Register 706 may be coupled to multiplexer 710 via interface 724. Also coupled to interface 724 may be a parity check block 708. Parity Check block 708 may check the parity of a data element as it is released from register 706.

Multiplexer 710 may select interface 724 when transferring data between DBIF 618 and DSD bus 650. The data may then be provided to register 712 via interface 726 wherein register 712 may stage the data for FIFO 714. The data may then be provided to FIFO 714 via interface 728. Also coupled to interface 728 may be a parity check block 730. Parity Check block 730 may check the parity of a data element as it is released from register 712.

FIFO 714 may comprise a 34 bit by 64 word FIFO. FIFO 714 may function as a buffer between DBIF 618 and DSD bus 650. This may be desirable because disk controller 682 may have to arbitrate for DSD bus 650, thus causing a unpredictable delay. FIFO 714 may store the data that is transferred by DBIF 618 to DSDC 636 until disk controller 682 is able to gain control of DSD bus 650. Once disk controller 682 gains access to DSD bus 650, FIFO 714 may wait for eight (8) words to be transferred from DBIF 618 to FIFO 714 before sending the data over DSD bus 650.

Once released by FIFO 714, the data may be provided to register 716 via interface 732. Register 716 may store the output of FIFO 714. The data may then be provided to multiplexer 718 via interface 734. Multiplexer 718 may select interface 734 when transferring data between DBIF 618 and DSD bus 650. The data may then be provided to data-out-register 720 via interface 736, wherein data-out-register 720 may stage the data for I/O buffer block 722. Parity conversion block 738 may provide a two to four bit parity conversion. That is, data arriving from DBIF 618 via multiplexer 718 may only have two parity bits associated therewith. It may be desirable to convert the two parity bits to a four parity bit scheme. Data-out-register 720 may then provide the data to I/O buffer block 722 via interface 740. I/O buffer block 722 may comprise a plurality of bi-directional transceivers wherein each of the transceivers may be enabled to drive the data onto DSD bus 650 via interface 654.

A second basic data path of DSDC 636 may provide an interface between DSD bus 650 and DBIF 618. This path may comprise I/O buffer block 722, a data-in-register 742, multiplexer 710, register 712, FIFO block 714, register 716, a multiplexer 744, a register 746, a multiplexer 748, and a register 750. For this data path, I/O buffer block 722 may be enabled to accept data from DSD bus 650 and provide the data to data-in-register 742 via interface 752. Data-in-register 742 may provide the data to multiplexer 710 via interface 754. Also coupled to interface 754 may be a parity check block 756. Parity Check block 756 may check the parity of a data element as it is released by data-in-register 742. Parity conversion block 758 may provide a four to two bit parity conversion. That is, data arriving from DSD bus 650 may have four parity bits associated therewith while DBIF interface 634 may only have two parity bits associated therewith. It may be desirable to convert the four parity bits to a two parity bit scheme.

Multiplexer 710 may select interface 754 when transferring data between DSD bus 650 and DBIF 618. The data may then be provided to register 712 via interface 726 wherein register 712 may stage the data for FIFO 714. The data may then be provided to FIFO 714 via interface 728. Also coupled to interface 728 may be parity check block 730. Parity Check block 730 may check the parity of a data element as it is released from register 712.

FIFO 714 may function as a buffer between DSD bus 650 and DBIF 618. This may be desirable because DBIF 618 may have to wait to gain access to the streets via interface 632. FIFO 714 may store data that is transferred by DSD bus 650 until DBIF 618 can gain access to the streets.

Once released by FIFO 714, the data may be provided to register 716 via interface 732. Register 716 may store the output of FIFO 714. The data may then be provided to multiplexer 744 via interface 760. Multiplexer 744 may select the data provided by register 716 during a data transfer between DSD bus 650 and DBIF 618. Multiplexer 744 may then provide the data to register 746 via interface 762. Register 746 may then provide the data to multiplexer 748 via interface 764. Multiplexer 748 may select 16 bits at a time of a 32 bit word provided by register 746. This may be necessary because the DSD bus may comprise a 32 bit word while the interface to DBIF 618 may only be 16 bits wide. Also coupled to interface 764 may be parity check block 768. Parity Check block 768 may check the parity of a data element as it is released from register 746. Multiplexer 748 may then provide the data to register 750. Register 750 may provide the data to DBIF 618 via interface 634.

A third basic data path of DSDC 636 may provide an interface between MBUS 638 and DSD bus 650. This path may comprise a I/O buffer block 770, a register 772, an address decode and recognition logic block 780, a multiplexer 774, a register 776, multiplexer 718, data-out-register 720, and I/O buffer block 722. For this data path, USBC's 640, 642 may provide a request to DSDC 636 via MBUS 638. The request may comprise a data word, an address, and a number of control signals. In the exemplary embodiment, an address including control signals may be provided over MBUS 638 first wherein a data word may follow on MBUS 638, if appropriate. I/O buffer block 770 may receive the request via interface 638 and may provide the request to register 772 via interface 784. Register 772 may provide the request to multiplexer 774 and to an address decode and recognition block 780 via interface 786. Also coupled to interface 786 may be a parity check block 788. Parity Check block 788 may check the parity of the request as it is released from register 772. Multiplexer 774 may select interface 786 during transfers from MBUS 638 to DSD bus 650. Multiplexer 774 may provide the request to register 776 via interface 790. Register 776 may then provide the request to multiplexer 718 via interface 792. Also coupled to interface 792 may be a parity check block 778. Parity Check block 778 may check the parity of the request as it is released from register 776.

Multiplexer 718 may select interface 792 when transferring data between MBUS 618 and DSD bus 650. Multiplexer 718 may provide the request to data-out-register 720 via interface 736 wherein data-out-register 720 may stage the request for I/O buffer block 722. Parity conversion block 738 may provide a two to four bit parity conversion. That is, data arriving from MBUS 638 via multiplexer 718 may only have two parity bits associated therewith. It may be desirable to convert the two parity bits to a four parity bit scheme. Data-out-register 720 may then provide the request to I/O buffer block 722 via interface 740. I/O buffer block 738 may be enabled to drive the request onto DSD bus 650 via interface 654. A fourth basic data path of DSDC 636 may provide an interface between DSD bus 650 and MBUS 638. This path may comprise I/O buffer block 722, data-in-register 742, parity conversion block 758, multiplexer 774, a multiplexer 777, register 776, a register 794, and I/O buffer block 770. I/O buffer block 722 may receive a data element from DSD bus 650. In an exemplary embodiment, the data element may comprise pointers and/or temporary data requested by USBC0 640 or USBC1 642 from memory 680. I/O buffer block 722 may provide the pointers and/or temporary data to data-in-register 742 via interface 752. Data-in-register 742 may provide the pointers and/or temporary data to parity conversion block 758 via interface 754. Parity conversion block 758 may provide a four to two bit parity conversion thereof. Parity conversion block 758, and register 742 may then provide the pointers and/or temporary data to multiplexer 774 via interface 754. Multiplexer 774 may select interface 754 when transferring data between DSD bus 650 and MBUS 638. Multiplexer 774 may then provide the pointer and/or temporary data to register 776 via interface 790. Register 776 may provide the pointers and/or temporary data to multiplexer 777 via interface 792. Multiplexer 777 may select interface 792 when transferring data between DSD bus 650 and MBUS 638. Multiplexer 777 may provide the pointers and/or temporary data to register 794. Register 794 may provide the pointers and/or temporary data to I/O buffer block 770 via interface 796. Also coupled to interface 796 may be a parity check block 798. Parity Check block 798 may check the parity of the request as it is released from register 794. I/O buffer block 770 may provide the pointers and/or temporary data to USBC0 640 or 642 via MBUS 638.

USBCs 640 and 642 do not interface directly with DSD bus 650 but rather may access memory 680 and disk controller 682 indirectly using registers in DSDC 636. For example, when USBC0 640 performs a read of memory 680, it initiates the transfer by writing a DSDC register 772 with the requested address. Register 772 may provide the address to address recognition logic block 780 via interface 786. The address may then be provided to register 773 (see FIG. 8B). Register 773 may then provide the address to multiplexer 852. Multiplexer 852 may select the output of register 773 when transferring an address from USBC0 640 to memory 680. Multiplexer 773 may then provide the address to address register 856 via interface 858.

DSDC 636 then performs bus arbitration, and provides the address to memory 856. Memory 680 then provides the requested data on DSD bus 650. DSDC 636 may then read the data on DSD bus 650 and provide the result to MBUS 638. Referring to FIG. 8A, register 742 may receive the read data word and may provide the read data word to multiplexer 774 via interface 754. Multiplexer 774 may then provide the read data word to register 776 wherein register 776 may provide the read data word to multiplexer 777. Multiplexer 777 may then provide the read data word to register 794 wherein the read data word may be provided to USBC0 640 via I/O buffer 770. Depending on whether an address or a data word is provided by USBC0 640 via MBUS 638, the corresponding address or data element may be routed to the appropriate location within DSDC 636.

In addition to providing the above reference data paths, DSDC 636 may provide a number of other functions. For example, logic may be provided to allow a test function of memory 680 and disk controller 682. For example, DSDC 636 may have a dynamic scan register 809 which may be coupled to NIM 635 via interface 633. NIM 635 may scan in an address and a function code into dynamic scan register 809. The address may then be provided to address register 851 (see FIG. 8B) within address decode and recognition logic block 780 via interface 810. Register 851 may provide the address to address output register 856 via multiplexer 852.

For a dynamic read operation of memory 680, the address may be an initial read address which may be scanned into dynamic scan register 809 as described the address may be the address may be automatically incremented by an auto-increment block 826 (see FIG. 8B) such that a number of successive read operations may be made to memory 680. After the initial address is provided, NIM 635 may provide a control word to dynamic scan register 809. The control word may comprise a word count and a function code. For a read operation, the function code may indicate a read function. The word count may be latched into a word count register 853 (see FIG. 8B) wherein after each read operation, the word count register may be decremented. When the word count register reaches a value of zero, DSDC 636 may terminate the above referenced read operation. For each read operation performed, the resulting data may be latched into data-in-register 742. A multiplexer 800 may then select interface 754 thereby storing the resulting data into register 802. The data may then be provided to dynamic scan register 809 via interface 812. The resulting data may then be scanned out of dynamic scan register 809 via NIM 635 for analysis.

For a write operation, the address may be an initial write address and function code which may be scanned into dynamic scan register 809 as described above. Thereafter, the address may also be automatically incremented by an auto-increment block 826 (see FIG. 8B) such that a number of successive write operations may be made to memory 680. For a write operation, the function code may indicate a write function. For each write operation performed, a corresponding data word may be scanned into dynamic scan register 809. The data word may be provided to multiplexer 800 wherein multiplexer 800 may provide the data word to register 802. Register 802 may provide the data word to multiplexer 718 via interface 812. Multiplexer 718 may provide the data word to data-out-register 720 via interface 736 wherein data-out-register 720 may stage the request for I/O buffer block 722. Data-out-register 720 may then provide the request to I/O buffer block 722 via interface 740. I/O buffer block 738 may be enabled to drive the data word to memory 680 via interface 654. The exemplary read and write operations discussed above may be used to perform tests on memory 680 and/or disk controller 682.

Another exemplary function that may be provided by DSDC 636 may be to support a partial block update function provided by host interface adapter 534. That is, in the exemplary system, a file may comprise a plurality of segments and each of the plurality of segments may comprise a plurality of blocks. Each of the blocks may comprise a plurality of words. When a host processor only updates a portion of a file, it may be advantages to only over-write the affected portions of the file to non-volatile memory 540. The host interface adapter block 534 supports the partial block update function. However, some of the supporting logic is located on DSDC ASIC 636. The partial block update function may increase the performance of the file caching system.

Register 830, wobb first block 832, wobb last block 834, and register 836 may support the partial block update function of the host interface adapter 534. A further discussion of the partial block update function may be found in the above referenced co-pending U.S. patent application Ser. No. 08/172,663, which is incorporated herein by reference.

Finally, SRAM control-block mode-and bist block 822 may provide a number of functions. An exemplary function may be to provide control signals to memory 680. Another exemplary function may be to provide error detection and test for DSDC 636, memory 680 and disk controller 682.

Finally, DSDC 636 may provide a data ready block 824 which may be coupled to MBUS 638. Data ready block 824 may indicate to MBUS 638 when a corresponding read and/or write operation has been completed by DSDC 636.

Figure 8B:
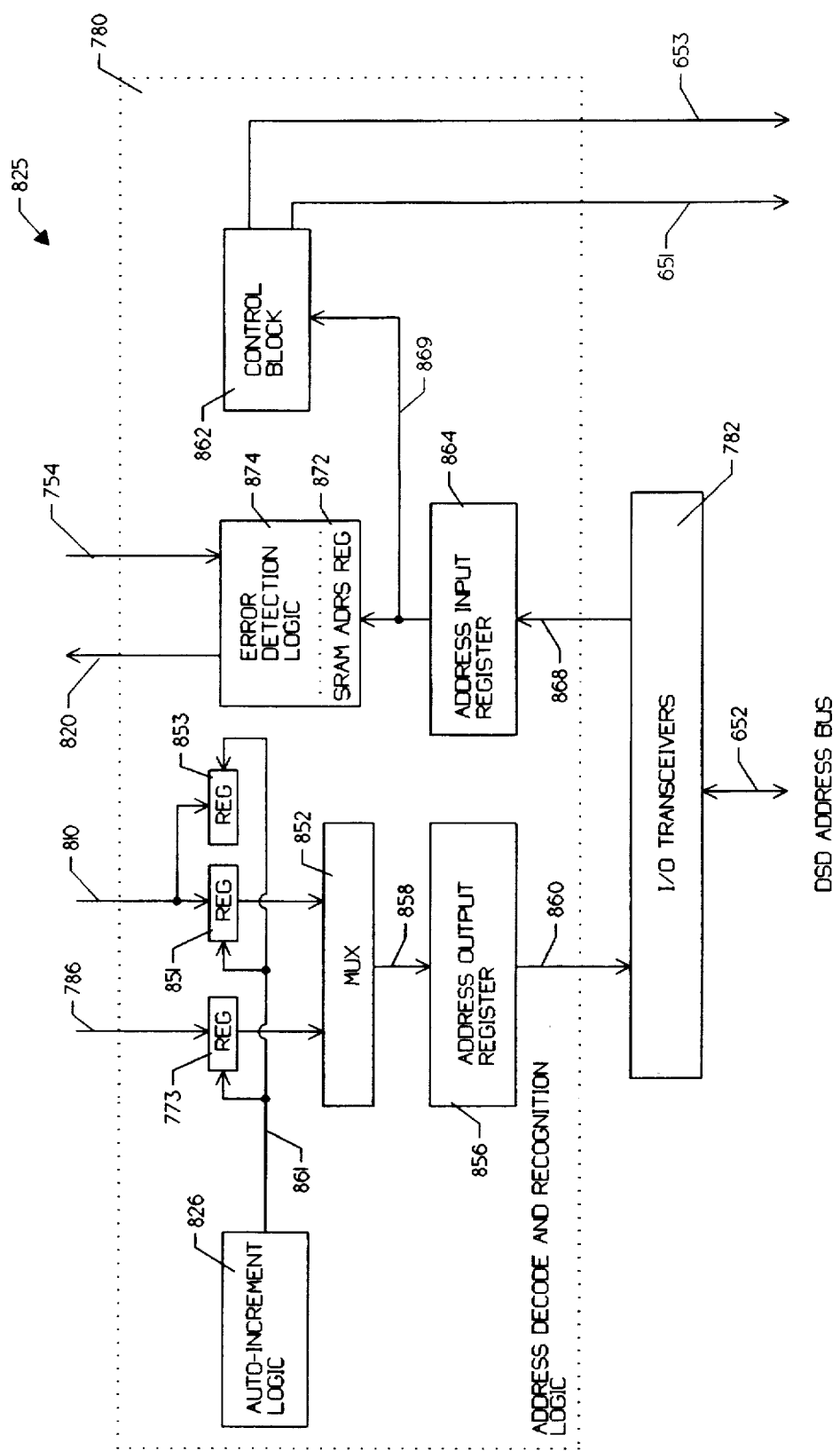
FIG. 8B is a block diagram showing applicable portions of the Address and Recognition Logic block of FIG. 8A.

FIG. 8B is a block diagram showing applicable portions of the Address and Recognition Logic block of FIG. 8A. The block diagram is generally shown at 825. In the exemplary embodiment, Address and Recognition Logic block 780 may comprise an address output register 856 and an address input register 872. Address output register 856 may be coupled to an outgoing port of I/O buffer block 782 via interface 860. Similarly, address input register 864 may be coupled to an in-going port of I/O buffer block 782 via interface 868.

An address may be provided to register 773 by MBUS 638 via interface 792, as described above. Further, an address may be provided to register 851 by dynamic scan register 809 via interface 810, as described above. When MBUS 638 is providing an address to DSD address bus 652, multiplexer 852 may select the output of register 773. Similarly, when NIM 635 is providing an address via dynamic scan register 809, multiplexer 852 may select the output of register 851. Multiplexer 852 may provide the selected address to address output register 856 via interface 858. Address output register 856 may provide the address to DSD address bus 652 via I/O buffer block 782.

Address recognition block 780 may determine if a request on interface 786 comprises an address. If the request comprises an address, corresponding control signals provided by register 772 via interface 786 may determine the appropriate format thereof. For example, one format for an address may indicate that the present address should be loaded, but each address thereafter should be generated by an automatic increment block 826, for a predetermined number of cycles (see FIG. 10). Address recognition logic block 780 may make this determination and alert auto-increment block 826. Auto-increment block 826 may thereafter automatically increment and/or decrement the value in registers 773, 851, or 853 via interface 861.

Address input register 864 may be coupled to DSD address bus 652 via I/O buffer block 782. Address input register 864 may latch the contents of DSD address bus 652 and monitor the contents thereof. Address input register 864 may be coupled to a control block 862 via interface 868. Control block 862 may monitor the DSD address via the address input register 864 and provide appropriate control signals to DSD bus 650 via interface 651. In the exemplary embodiment, control block 862 may provide control signals that memory 680 and disk controller 682 may not otherwise provide. For example, control block 862 may provide four (4) byte enable signals, a ready-in signal, and a read/write enable signal (see FIG. 9A-9B) to memory 680 via interface 653. For example, the NCR53C720 SCSI controller 682 requires a ready-in signal to be asserted by a slave device indicating that the slave device is ready to transfer data. DSDC ASIC 636 may provide the ready-in signal for both DSDC 636 and memory 680.

Finally, an error detection logic block 874 may be coupled to address input register 864 via interface 868. Error detection logic block 874 may comprise a SRAM address register 872. SRAM address register 872 may capture an SRAM address when an SRAM read error is detected. That is, SRAM address register 872 may store the read address that is present on DSD address bus 650 in response to an SRAM read error. Error detection block 874 may monitor the data that is present in DSD bus 650 via interface 754. Error detection block 874 may thus perform a parity check or the like on the data presently read from memory 680. If an error exists, error detection block 874 may enable SRAM address register thereby capturing the current read address. This may identify the faulty read address within memory 680. Error correction block 874 may then provide the faulty read address to USBC0 640 for further processing via interface 820. For example, USBC0 640 may read and write various test patterns to the faulty read address to determine if the fault was caused by a soft error or a hard error. If the fault was caused by a soft error, the contents of memory 680 may be reloaded and the operation of the computer system may continue. However, if the fault was caused by a hard error, the operation of the computer system may be interrupted. Other error detection schemes are contemplated and may be incorporated into error detection block 874.

FIGS. 9A-9B comprise a table illustrating an exemplary bus description of the DSD bus of FIG. 7. The table is generally shown at 900. DSD bus 650 may comprise a number of fields. The type of fields can be generally broken down into data fields, address fields, parity fields, and control fields. The fields for an exemplary embodiment of DSD bus 650 are described below.

DSD bus 650 may comprise a 32 bit data bus as shown at 902. The 32 bit data bus is a bi-directional data bus and may serve as the main data path for all operations. The 32 bit data bus may be asserted by a bus master for write operations and a bus slave for read operations.

DSD bus 650 may further comprise a 4 bit data parity bus as shown at 904. Each of the four parity bits may correspond to predetermined data bits of 32 bit data bus 902. The 4 bit data parity bus may be used for error detection and correction purposes.

DSD bus 650 may further comprise a 30 bit address bus as shown at 906. The 30 bit address bus is a bi-directional address bus and may serve as the main address path for all operations. The 30 bit address bus may be asserted by a bus master.

DSD bus 650 may further comprise an address status line (ADS\) as shown at 908. The address status line may be active low and when asserted by a bus master, may indicate that the value on the 30 bit address bus 906 are valid. In an exemplary mode, the address status line may be asserted to indicate a start of a bus cycle.

DSD bus 650 may further comprise a write/read line (W-R\) as shown at 910. The write/read line may be active low and may indicate the direction of the data transfer relative to the bus master. The write/read line may be driven by the bus master.

DSD bus 650 may further comprise a hold line as shown at 912. The hold line may be asserted by the disk controller 682 to request bus mastership. The hold line may be active low and may be provided by the NCR53C720 SCSI I/O processor 682.

DSD bus 650 may further comprise a hold acknowledge (HLDA\) line as shown at 914. The hold acknowledge line may be asserted by DSD bus arbitration logic 786 to indicate that the previous bus master has relinquished control of the DSD bus 650. The hold acknowledge line may be active low.

DSD bus 650 may further comprise a bus clock (BCLK) line as shown at 916. The bus clock signal may control the DMA portion of the NCR53C720 SCSI I/O processor 682. The bus clock may be provided by DSDC 636.

DSD bus 650 may further comprise a chip reset line as shown at 918. The chip reset line may be active low and may force a synchronous reset of the NCR53C720 SCSI I/O processor 682. In the exemplary embodiment, the chip reset line may be asserted by DSDC 636 for a minimum of 15 bus cycles.

DSD bus 650 may further comprise a chip select (CS\) line as shown at 920. The chip select line may select the NCR53C720 SCSI I/O processor 682 as a slave device. In the exemplary embodiment, the chip select line may be active low and may be connected to address bit 6 of the 30 bit address bus discussed above.

DSD bus 650 may further comprise an interrupt (IRQ\) line as shown at 922. The interrupt line may be active low and may indicate that service is required from USBC0 640 and/or USBC1 642.

Referring to FIG. 9B, DSD bus 650 may further comprise four byte enable (BE) lines as shown at 924, 926, 928, and 930. Each of the bus enable lines may be active low and each may be asserted by the bus master. A first byte enable line (BE0) may enable the transfer of data over data bus lines 24–31. A second byte enable line (BE1) may enable the transfer of data over data bus lines 16–23. A third byte enable line (BE2) may enable the transfer of data over data bus lines 8–15. Finally, a fourth byte enable line (BE3) may enable the transfer of data over data bus lines 0–7.

DSD bus 650 may further comprise a ready-in (READYI\) line as shown at 932. The ready-in line may be provided by the slave device to the master device indicating that the slave device is ready to transfer data to the master device. The ready-in line may be active low and may be provided by DSDC 636 even if DSDC 636 is not the master of the bus.

DSD bus 650 may further comprise a ready-out (READYO\) line as shown at 934. The ready-out line may be asserted to indicate the end of a slave cycle. In the exemplary embodiment, the ready-out line may be active low and may be provided by disk controller 682 to terminate a slave cycle.

DSD bus 650 may further comprise a master line as shown at 936. The master line may be asserted by the NCR53C720 I/O processor 682 to indicate it has become bus master. The master line may be active low.

DSD bus 650 may further comprise a bus mode select (BS) bus as shown at 938. The bus mode select bus may select the bus mode and addressing mode of the NCR53C720 I/O processor 682. In the exemplary embodiment, the bus mode select bus is set to "010", thereby selecting a 80386DX like bus mode (bus mode 4) and the big endian addressing mode.

Finally, DSD bus 650 may further comprise a scripts autostart mode (AUTO\) line as shown at 940. The scripts autostart mode line selects either auto or manual scripts start mode. Script routines may be stored in memory 680 and may control a RISC processor in NCR53C720 SCSI I/O processor 682. When scripts autostart mode is set low, the execution of the scripts programs starts at address zero of a DSP register within NCR53C720 SCSI I/O processor 682, immediately following a chip reset. When scripts autostart mode is set high, the execution of the scripts programs starts at an address which corresponds to a value which is loaded into the DSP register by USBC0 640 and/or USBC1 642, immediately following a chip reset. In the exemplary embodiment, the scripts auto start mode line is set to one.

As indicated with reference to FIG. 7, a number of control signals may be provided between DSDC 636 and disk controller 682 via interface 651. These signals may include the signals shown at 906, 908, 910, 912, 914, 916, 918, 920, 922, 932, 934, 936, and 938. Similarly, a number of control signals may be provided between DSDC 636 and memory 680 via interface 653. These signals may include a memory read/write enable signal and the four byte enable signals shown at 924, 926, 928 and 930.

Figure 10:
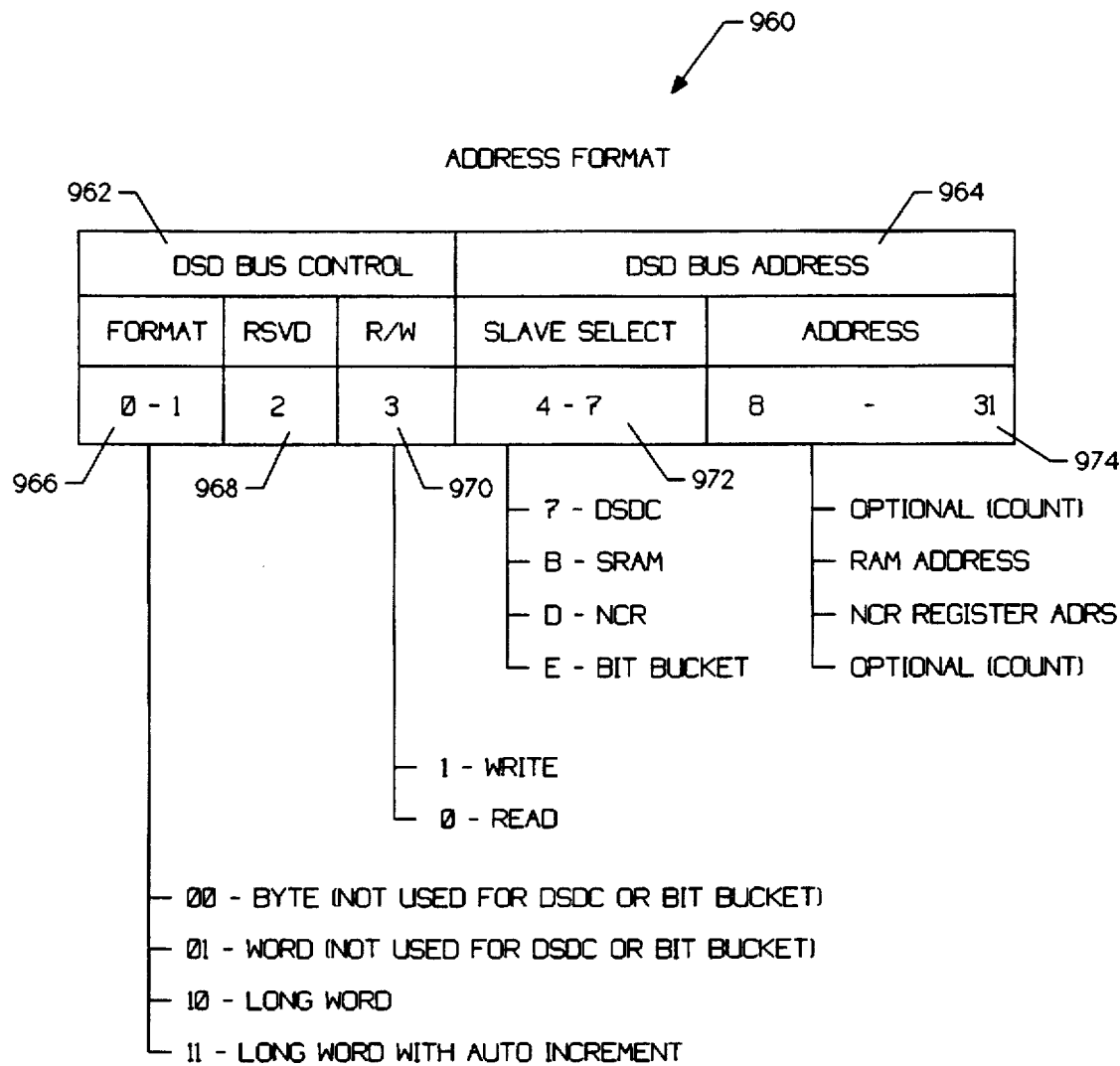
FIG. 10 is a table illustrating an exemplary address format for the address field of the DSD bus of FIG. 7.

FIG. 10 is a table illustrating an exemplary address format for the address field of the DSD bus of FIG. 7. The table is generally shown at 960. The address format of the address field of DSD bus 650 may comprise DSD bus control signals 962 and DSD bus address signals 964. The DSD bus control signals may comprise a format field 966, a reserved field 968, and a read/write field 970. The DSD address signals may comprise a slave select field 972 and an address field 974.

The format field 966 may specify the format of a corresponding address. For example, the format field may specify the format of a corresponding address as a long word or a long word with auto increment. The auto increment option is further discussed above with reference to FIG. 8A and FIG. 8B. The read/write field 970 may indicate whether the corresponding address is requesting a read or write operation.

The slave select field 972 may indicate which of the three devices attaches to DSD bus 650 is to be the slave. That is, if DSDC 636 has bus mastership and is providing the address, the slave select field may indicate whether NCR53C720 682 or memory 680 is to be the slave. Finally, the address field 974 provides a valid address to the selected slave device. That is, if memory 680 is the slave device, the address field 974 may provide a valid memory address thereto. Under some conditions, the address field is optional as shown. That is, when DSDC 636 is the slave device, the address field is optional. The slave select field identifier shown below slave select field 972 correspond to the address field identifiers shown below address field 974. Format bits 0 and 1, and address bits 30 and 31 may be decoded to provide the bi-directional byte enable signals 924, 926, 928, and 930 as shown in FIG. 9B.

Figure 11:
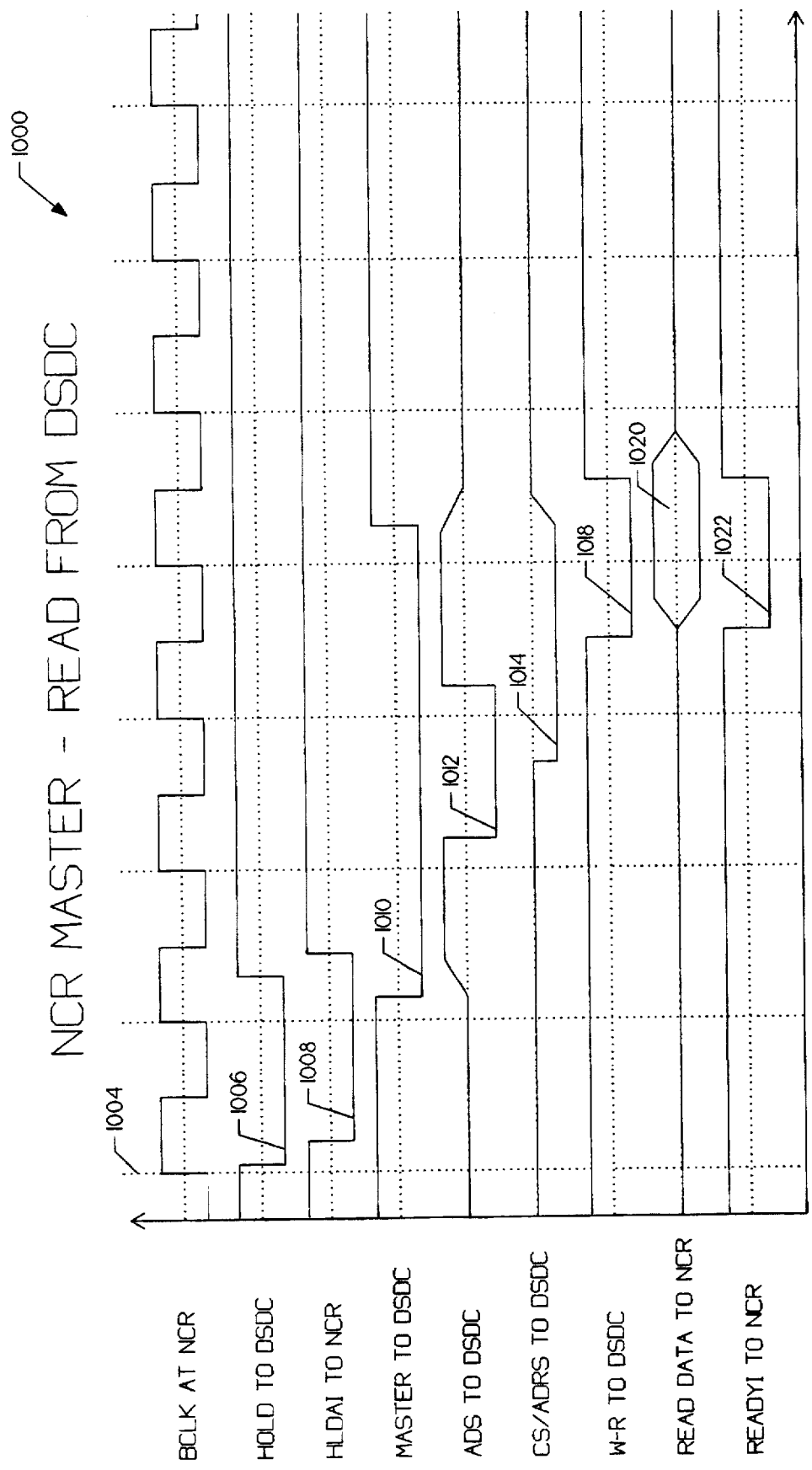
FIG. 11 is a timing diagram illustrating an exemplary read cycle on the DSD bus wherein the NCR chip is the master and the DSDC device is the slave.

FIG. 11 is a timing diagram illustrating an exemplary read cycle on the DSD bus wherein the NCR chip is the master and the DSDC device is the slave. The timing diagram is generally shown at 1000. In the exemplary embodiment, NCR53C720 682, memory 680, and DSDC 636 are coupled to the DSD bus 650. Tri-state transceivers are used by all three devices to interface with the bi-directional lines of the DSD bus 650. Data transfer cycles are initiated and terminated by whichever device is bus master at given time. The direction of data transfer (read/write) is relative to the bus master. Only one device can be bus master for a given data transfer cycle.

When one of the three devices is the bus master, one of the two remaining devices may be the bus slave, and is either the source (read) or destination (write) of the data transfer. The third device on DSD bus 650 is inactive. NCR53C720 682 and DSDC 636 may be either a bus master or a bus slave, while memory 680 may only be a bus slave. Arbitration logic 786 in DSDC 636 may determine which device will be the next bus master when the present bus master relinquishes control of DSD bus 650.

Referring specifically to NCR53C720 682, NCR53C720 682 arbitrate for bus mastership to fetch SCRIPTS instructions from memory 680 and to transfer data to/from the SCSI interface 554. After an instruction fetch or data transfer is complete, NCR53C720 682 may relinquish bus mastership. When executing block move instructions, NCR53C720 682 may relinquish bus mastership after transferring eight long words. However, if more data needs to be transferred, NCR53C720 682 may wait 5 to 8 clock cycles and then initiates arbitration to regain bus mastership to transfer up to 8 more long words. This process may continue until the block move instruction is complete. In the exemplary embodiment, the effective data transfer rate of a block move instruction to/from the SCSI disk(s) may be in excess of 20 MB/s.

Referring specifically to FIG. 11, wherein an exemplary read operation is shown with NCR53C720 682 as bus master and DSDC 636 is bus slave. The signal names provided along the left side of timing diagram 1000 generally correspond to the signals described with reference to FIGS. 9A and 9B.

At time 1004, NCR53C720 682 may assert a hold signal as shown at 1006, indicating to all of the devices coupled to DSD bus 650 that NCR53C720 682 is requesting bus mastership. Arbitration logic 786 within DSDC 636 may receive the hold signal 1006 and may assert a hold acknowledge signal in response thereto, as shown at 1008, indicating that the previous bus master has relinquished control of DSD bus 650. On the next bus clock cycle, NCR53C720 682 may assert a master signal to DSDC 636 as shown at 1010, indicating to DSDC 636 that NCR53C720 682 has become bus master of DSD bus 650. NCR53C720 682 may then assert an address status signal as shown at 1012. The address status signal indicates the start of a bus cycle. Shortly thereafter, and while the address status signal is still asserted, NCR53C720 682 may provide an address to DSDC 636 as shown at 1014. The select slave field of the address may select DSDC 636 to be the slave for this bus transaction.

NCR53C720 682 may then provide a read/write signal 1018 to DSDC 636. The read/write signal 1018 indicates that NCR53C720 682 is requesting to read data from DSDC 636. Finally, DSDC 636 may provide a ready-in 1022 signal to NCR53C720 682, indicating that DSDC 636 is ready to transfer data thereto. The read data on DSD bus 650 may then be provided as shown at 1020.

Figure 12:
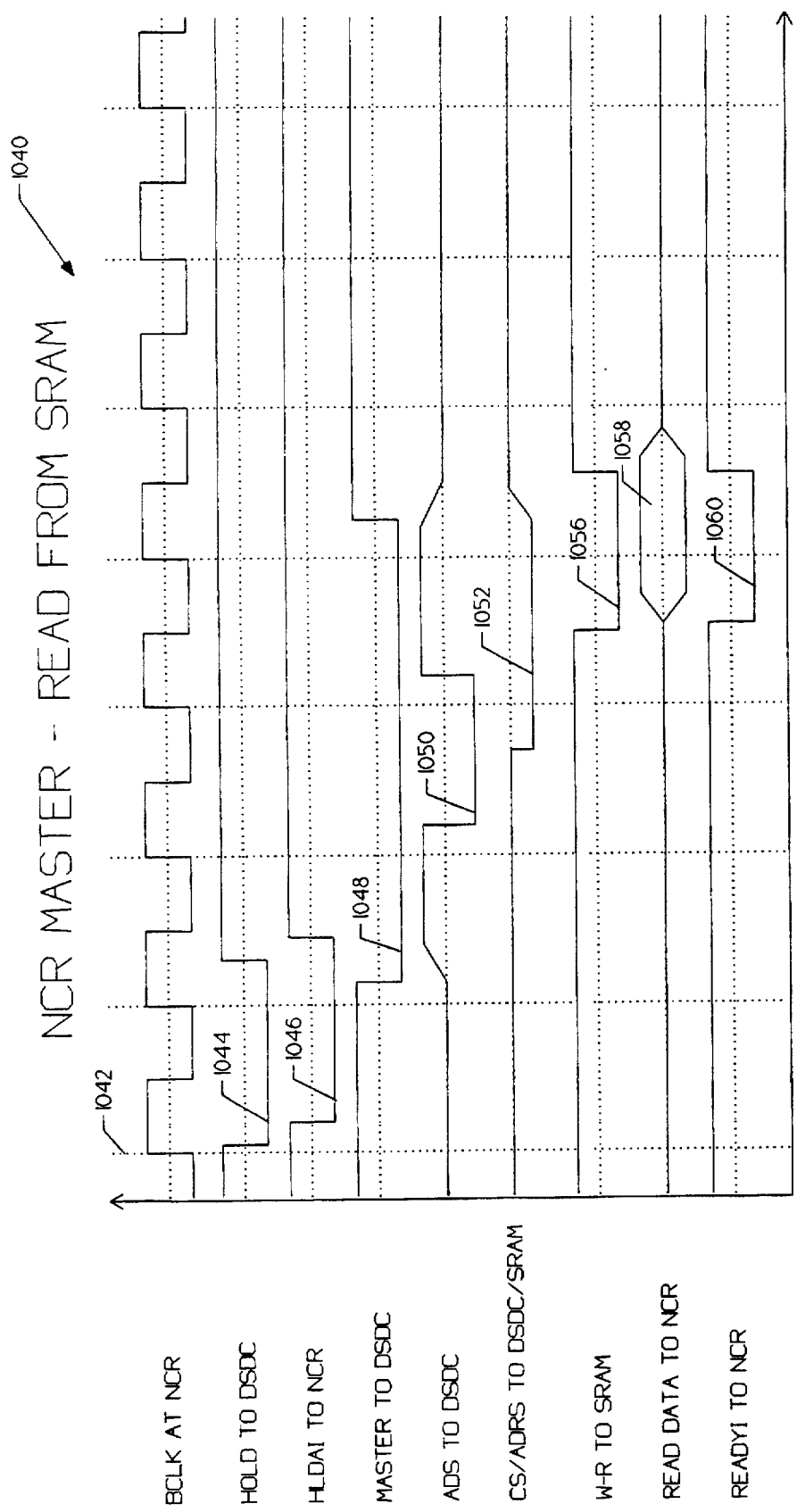
FIG. 12 is a timing diagram illustrating an exemplary read cycle on the DSD bus wherein the NCR chip is the master and the SRAM device is the slave.

FIG. 12 is a timing diagram illustrating an exemplary read cycle on the DSD bus wherein the NCR chip is the master and the SRAM device is the slave. The timing diagram is generally shown at 1040. The signal names provided along the left side of timing diagram 1040 generally correspond to the signals described with reference to FIGS. 9A and 9B.

At time 1042, NCR53C720 682 may assert a hold signal as shown at 1044, indicating to all of the devices coupled to DSD bus 650 that NCR53C720 682 is requesting bus mastership. Arbitration logic 786 within DSDC 636 may receive the hold signal 1044 and may assert a hold acknowledge signal in response thereto, as shown at 1046, indicating that the previous bus master has relinquished control of DSD bus 650. On the next bus clock cycle, NCR53C720 682 may assert a master signal to DSDC 636 as shown at 1048, indicating to DSDC 636 that NCR53C720 682 has become bus master of DSD bus 650. Note that it is not necessary to provide the master signal to memory 680 because memory 680 cannot be a bus master. NCR53C720 682 may then assert an address status signal as shown at 1050. The address status signal indicates the start of a bus cycle. Shortly thereafter, and while the address status signal is still asserted, NCR53C720 682 may provide an address to DSDC 636 and memory 680 as shown at 1052. The select slave field of the address may select memory 680 to be the slave for this bus transaction. NCR53C720 682 may then provide a read/write signal 1056 to memory 680. The read/write signal 1056 indicates that NCR53C720 682 is requesting to read data from memory 680. Finally, memory 680 may provide a ready-in signal 1060 to NCR53C720 682, indicating that memory 680 is ready to transfer data thereto. The read data on DSD bus 650 is shown at 1058.

Figure 13:
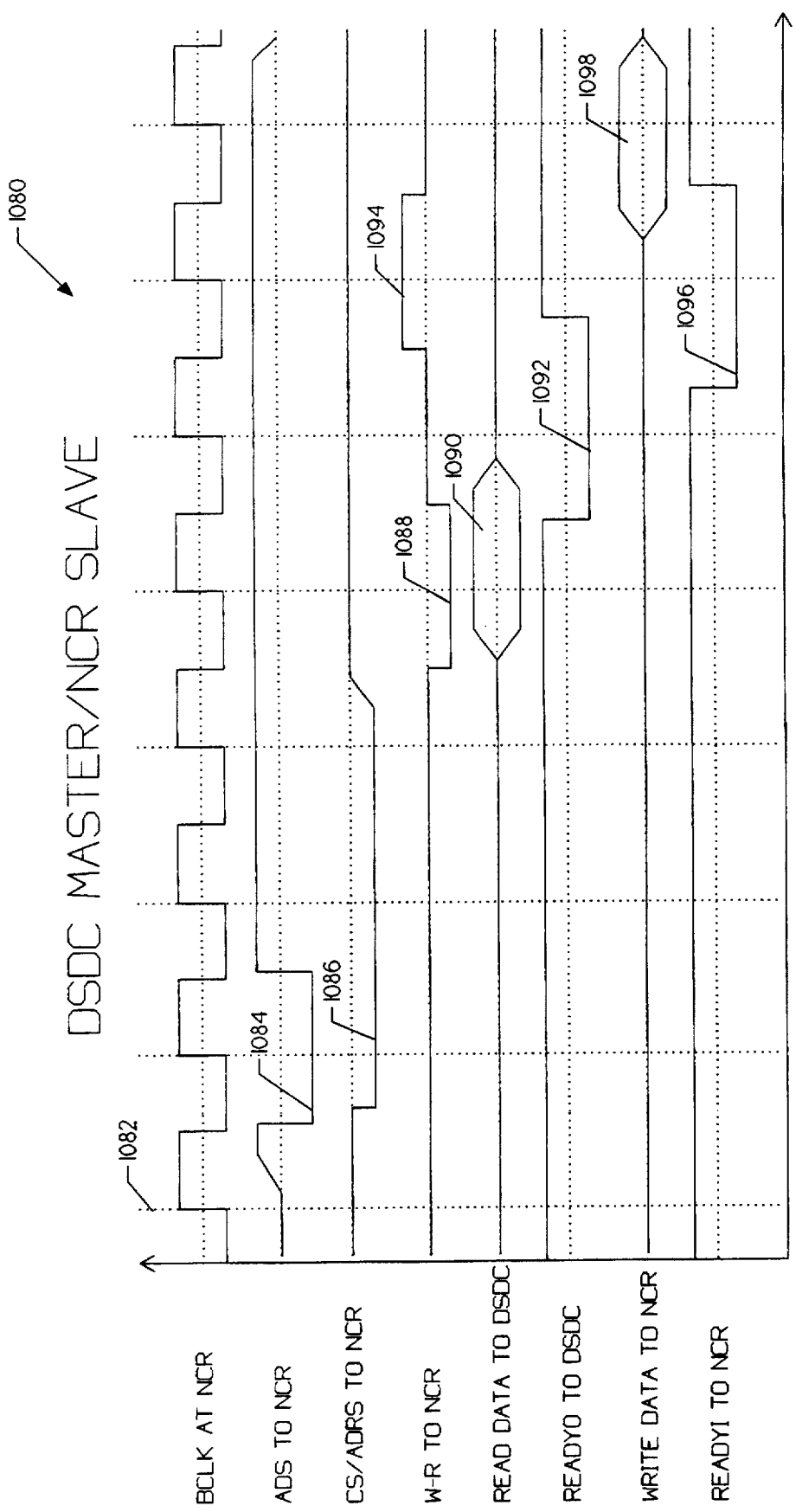
FIG. 13 is a timing diagram illustrating an exemplary read and write cycle on the DSD bus wherein the DSDC device is the master and the NCR chip is the slave.

FIG. 13 is a timing diagram illustrating an exemplary read and write cycle on the DSD bus wherein the DSDC device is the master and the NCR53C720 is the slave. The timing diagram is generally shown at 1080. At time 1082, DSDC 636 may assert an address status signal as shown at 1084. The address status signal indicates to NCR53C720 682 the start of a bus cycle. Shortly thereafter, and while the address status signal is still asserted, DSDC 636 may provide a chip select signal and an address to NCR53C720 682 and memory 680 as shown at 1086. The chip select signal selects the NCR53C720 682 as the slave device. The chip select signal may comprise the slave select field 972 of the DSD address 964.

DSDC 636 may then provide a read/write signal 1088 to NCR53C720 682. At 1088, DSDC 636 provides a low on the read/write signal indicating that DSDC 636 is requesting a read from NCR53C720 682. NCR53C720 682 may then provide the requested read data to DSDC 636 as shown at 1090. Thereafter, NCR53C720 682 may provide a ready-out signal 1092 to DSDC 636 to indicate the end of the slave bus cycle. DSDC 636 may then provide a read/write signal 1094 to NCR53C720 682. At 1094, DSDC 636 provides a high on the read/write signal indicating that DSDC 636 is requesting to write to NCR53C720 682. DSDC 636 may provide a ready-in signal 1096 to NCR53C720 682, indicating that DSDC 636 is ready to write data thereto. DSDC 636 may then provide the write data to NCR53C720 682 as shown at 1098.

Figure 14:
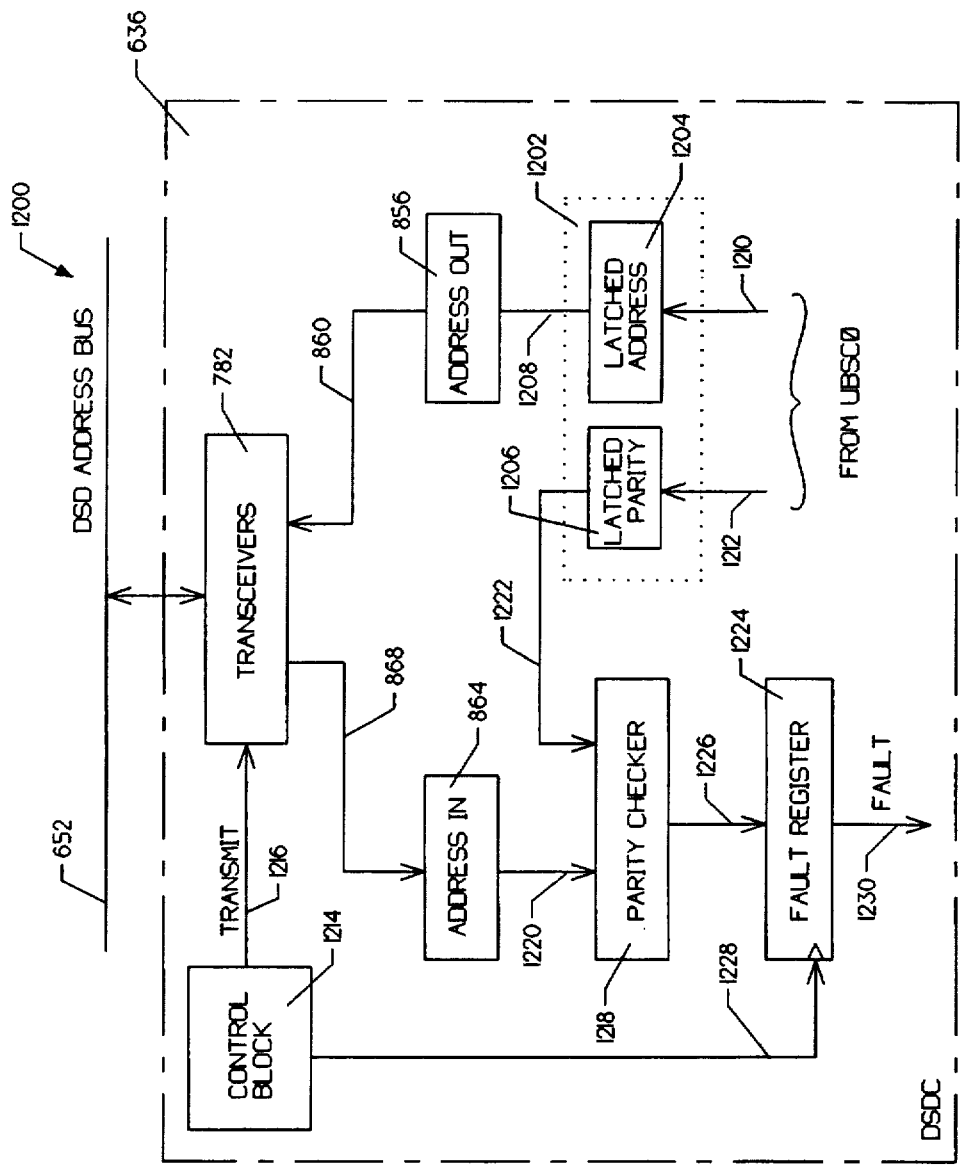
FIG. 14 is a block diagram of a third exemplary embodiment of the present invention, which is incorporated into the computer system described with reference to FIG. 5 through FIG. 13.

FIG. 14 is a block diagram of a third exemplary embodiment of the present invention, which is incorporated into the computer system described with reference to FIG. 5 through FIG. 13. The block diagram is generally shown at 1200. As discussed above, DSDC 636 may be coupled to DSD address bus 652. Memory 680 and disk controller 682 may be further coupled to DSD address bus 652 (see FIG. 7). In the exemplary embodiment, memory 680 may comprise a number of standard off-the-shelf memory devices. Therefore, DSD address bus 652 may not be sufficiently wide to accommodate a number of additional parity bits. Further, memory 680 and/or disk controller 682 may not have a fault detection capability provided therein.

As discussed above, USBC0 640 may perform a read operation of memory 680 via DSDC 636. To accomplish this, USBC0 640 may provide an address to DSDC 636 wherein DSDC 636 may arbitrate for DSD bus 650. After gaining control of DSD bus 650, DSDC 636 may provide the address to memory 680. Memory 680 may then provide a corresponding read data word to DSDC 636, wherein USBC0 640 may read the read data word from DSDC 636 to complete the read operation.

It may be desirable to provide error detection to DSD bus 650 during this and other transfers. In the exemplary embodiment, USBC0 640 may provide an address 1204 and a corresponding number of parity bits 1206 to DSDC 636 via interfaces 1210 and 1212, respectively. Address 1204 and the corresponding number of parity bits 1206 may be latched into a register 1202. Register 1202 may provide address 1204 to the address-out register 856 via interface 1208. Thereafter, address-out register 856 may provide the address to the input ports of the corresponding output buffers of transceiver block 782 via interface 860, while the corresponding number of parity bits 1206 may remain stored within DSDC 636. A control block 1214 may then place the corresponding transceiver block 782 into a transmit mode via interrace 1216, wherein address 1204 may be driven onto DSD address bus 652 to memory 680, thereby resulting in an address bus word.

As described above, the address bus word may be provided back into DSDC 636 via the input buffers of the corresponding transceiver block 782. The address bus word may be provided to an address-in register 864 via interface 868, thereby resulting in an address check word. DSDC 636 may then provide the address check word to a parity checker block 1218 via interface 1220. Further, previously generated parity bits 1206 may be provided to parity checker block 1218 via interface 1222. Parity checker block 1218 may regenerate a number of parity bits for the address check word and compare the regenerated number of parity bits with the number of previously generated parity bits 1206. If the regenerated parity bits do not compare with the previously generated parity bits 1206, a fault may be indicated.

Control block 1214 may provide an enable signal to fault register 1224 via interface 1228. The enable signal on interface 1228 may be asserted by control block 1214 a predetermined time after the transmit signal is asserted on interface 1216. That is, the enable signal on interface 1228 may only enable fault register 1224 when transceiver block 782 is in the transmit mode.

Parity checker block 1218 may provide a fault to fault register 1224 via interface 1226 wherein fault register 1224 may latch the fault therein when control block 1214 provides an enable to fault register 1224 via interface 1228, as described above. Fault register 1224 may provide the fault to DSDC 636 via interface 1230. In this way, the exemplary embodiment may detect opens, shorts, stuck-at-faults, etc., which may occur on DSD address bus 652. Further, the exemplary embodiment may provide continuous validation of transceiver block 782 and any supporting circuitry including the address-out register 856 and the address-in register 864, whenever DSDC 636 is in the transmit mode. This may be especially important because, in the exemplary embodiment, address-in register 864 and address-out register 856 may not be provided with any fault detection capability whatsoever. The present invention provides a means for providing an error detection capability thereto.

Although only a read operation is described above, it is contemplated that other bus transfers may be fault protected in a similar way. Further, it is contemplated that disk controller 682 and/or memory 680 may incorporate a similar function as described above.

Figure 15:
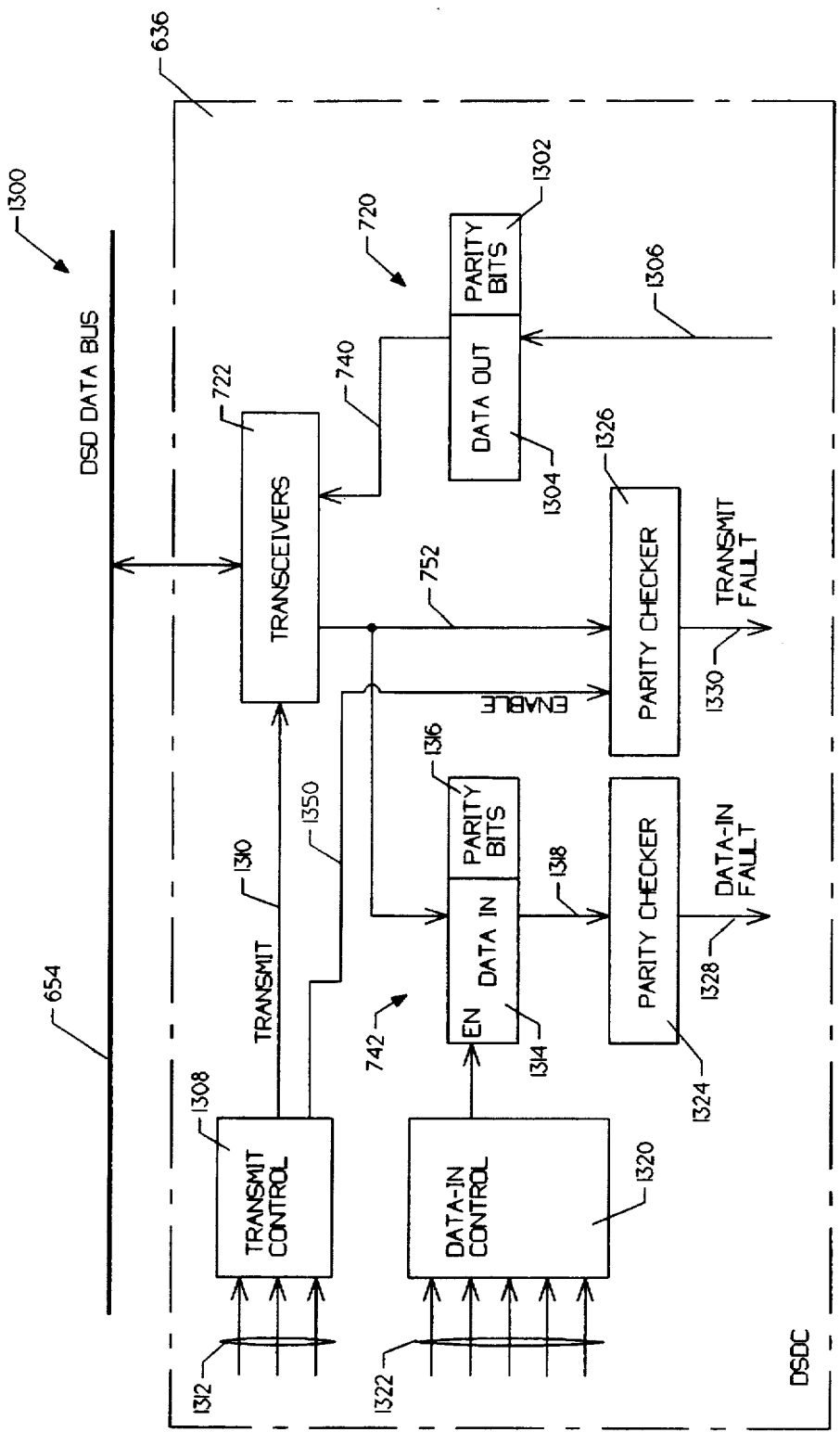
FIG. 15 is a block diagram of a fourth exemplary embodiment of the present invention, which is incorporated into the computer system described with reference to FIG. 5 through FIG. 13.

FIG. 15 is a block diagram of a fourth exemplary embodiment of the present invention, which is incorporated into the computer system described with reference to FIG. 5 through FIG. 13. The block diagram is generally shown at 1300. As discussed above with reference to FIG. 7 through FIG. 8, DSDC 636 may be coupled to DSD data bus 654. Memory 680 and disk controller 682 may be further coupled to DSD data bus 654. In the exemplary embodiment, memory 680 may comprise a number of standard off-the-shelf memory devices. Therefore, memory 680 may not have a fault detection capability provided therein.

Referring to FIG. 15, DSDC 636 may be coupled to DSD data bus 654. Further, DSDC 636 may have a transceiver block 722 for interfacing with DSD data bus 654. A data-out register 720 may be provided wherein the output of data-out register 720 may be coupled to transceiver block 722 via interface 740. DSDC 636 may provide a data word 1304 and a number of corresponding parity bits 1302 to data-out register 720 via interface 1306.

When DSDC 636 becomes a transmitting user, a transmit control block 1312 may enable transceiver block 722 via interface 1310, thereby placing transceiver block 722 into a transmit mode. Data word 1304 and the number of corresponding parity bits 1306 may then be provided to DSD data bus 654 via transceiver block 722. This may result in a bus data word on DSD data bus 654. As discussed above, bus data word and the number of corresponding parity bits may be provided back to DSDC 636 via the input buffers of transceiver block 722. This may result in a check word on interface 752.

In one embodiment of the present invention, the check word may be provided from transceiver block 722 to parity checker 1326. Parity checker block 1326 may be enabled by transmit control block 1308 via interface 1350, whenever transceiver block 722 is in the transmit mode. That is, parity checker 1326 may detect an error on DSD data bus 654 whenever DSDC 636 is providing data thereto. The transmit fault may be provided to DSDC 636 via interface 1330.

Another exemplary embodiment may provide an error detect capability to all DSD data bus transfers, regardless of whether DSDC 636 is providing data thereto. The input buffers of transceiver block 722 may monitor bus 654 and provide a check word to interface 752, as described above. In the exemplary embodiment, a data-in control block 1320 may enable data-in register 742 when a parity check is desired. For example, data-in control block 1320 may enable data-in register 742 during a write transfer between DSDC 636 and memory 680, since memory 680 may not be capable of performing a parity check thereof. Further, data-in control block 1320 may enable data-in register 742 during any other predetermined data transmission between disk controller 682, memory 680, and/or DSDC 636. Data-in register 742 may provide the check word, including a check data word 1314 and a number of check parity bits 1316, to a parity checker block 1324 via interface 1318. Parity checker block 1324 may regenerate a number of parity bits for check data word 1314 and compare the number of regenerated parity bits with the number of check parity bits 1316. If the regenerated parity bits do not match the check parity bits 1316, parity checker block 1324 may issue an error to DSDC 636 via interface 1328.

In this way, parity checker 1324 may be used to continuously check the parity of DSD data bus 654. That is, the exemplary embodiment may provide a central hardware element which may validate predetermined bus transmissions, regardless of whether DSDC 636, disk controller 682 and/or memory 680 is driving DSD data bus 654. That is, a transmission between any two or more of the bus users coupled to DSD data bus 654, including DSDC 636, may be validated by parity checker block 1324. This may allow the exemplary embodiment to check the parity of otherwise un-checked data transmissions over DSD data bus 654.

It is contemplated that the central hardware element may be located in at least one of the devices coupled to DSD data bus 654, or may be provided in a separate element which is coupled to the DSD data bus 654. If the central hardware element is provided in a separate element which is coupled to DSD data bus 654, transceiver block 722 may comprise only a number of input buffers. The number of input buffer being necessary to monitor the DSD data bus 654 transmissions.

The centralization of the error detection function may help isolate where an error actually occurred. That is, since all DSD data bus transmissions may be monitored regardless of which user is the transmitting user or the receiving user, the exemplary embodiment may determine which user provided the error. For the memory read/write example described above, the exemplary embodiment may check the parity of a data write transmission to memory 680 and a corresponding data read transmission from memory 680. This may isolate the error to the transmitting user or to the memory. In prior art schemes, it may not be possible to determine which device may have caused the error.

Figure 16:
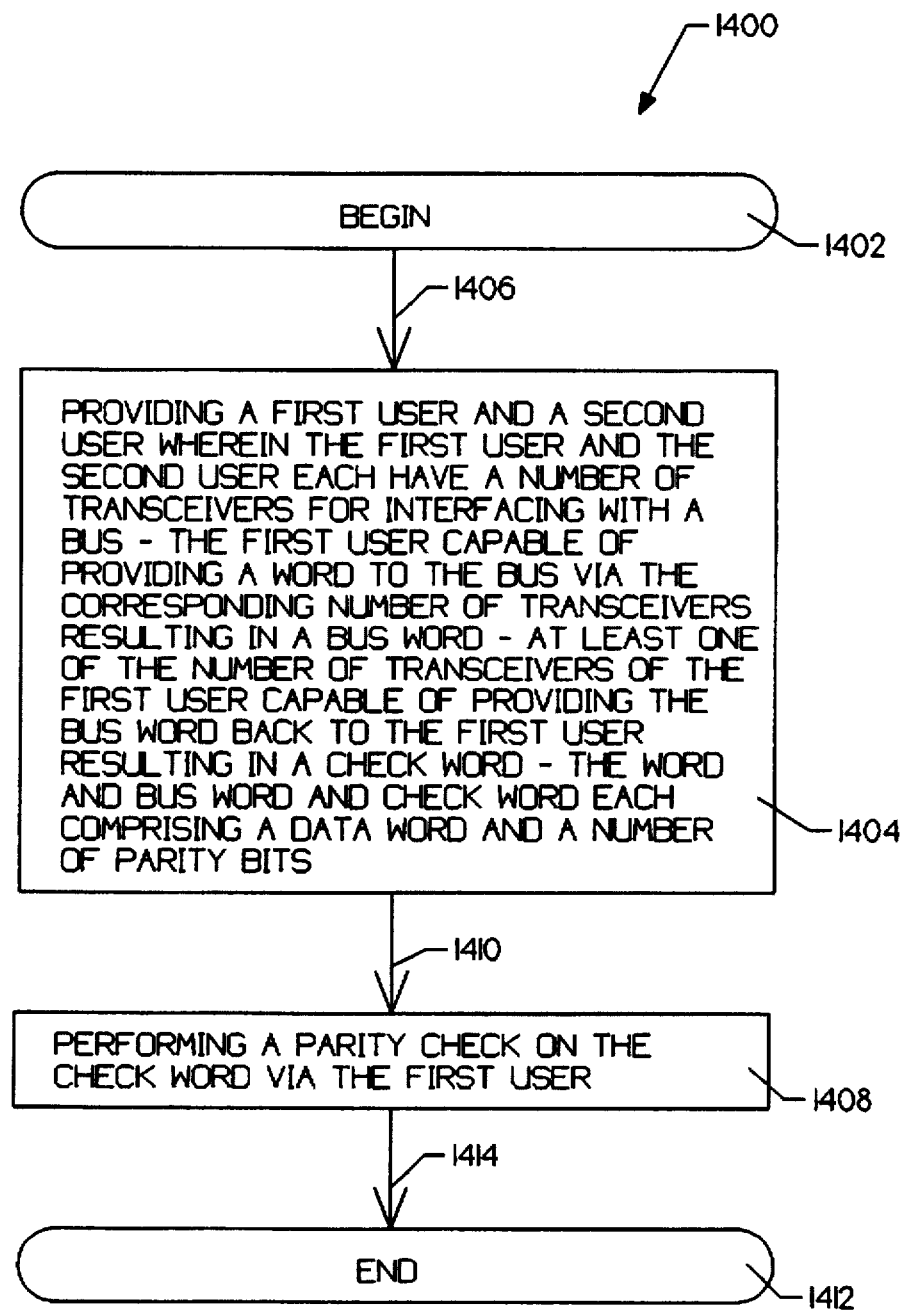
FIG. 16 is a flow diagram showing a first exemplary method of the present invention.

FIG. 16 is a flow diagram showing a first exemplary method of the present invention. The flow diagram is generally shown at 1400. The algorithm is entered at element 1402, wherein control is passed to element 1404 via interface 1406. Element 1404 provides a first user and a second user, wherein the first user and the second user each have a number of transceivers for interfacing with a bus. The first user may provide a word to the bus via the corresponding number of transceivers, thereby resulting in a bus word. At least one of the number of transceivers of the first user being capable of providing the bus word back into the first user, thereby resulting in a check word. The word, the bus word, and the check word each comprising a data word and a number of parity bits. Control is then passed to element 1408 via interface 1410. Element 1408 performs a parity check on the check word via the first user. Control is then passed to element 1412 via interface 1414, wherein the algorithm is exited.

Figure 17:
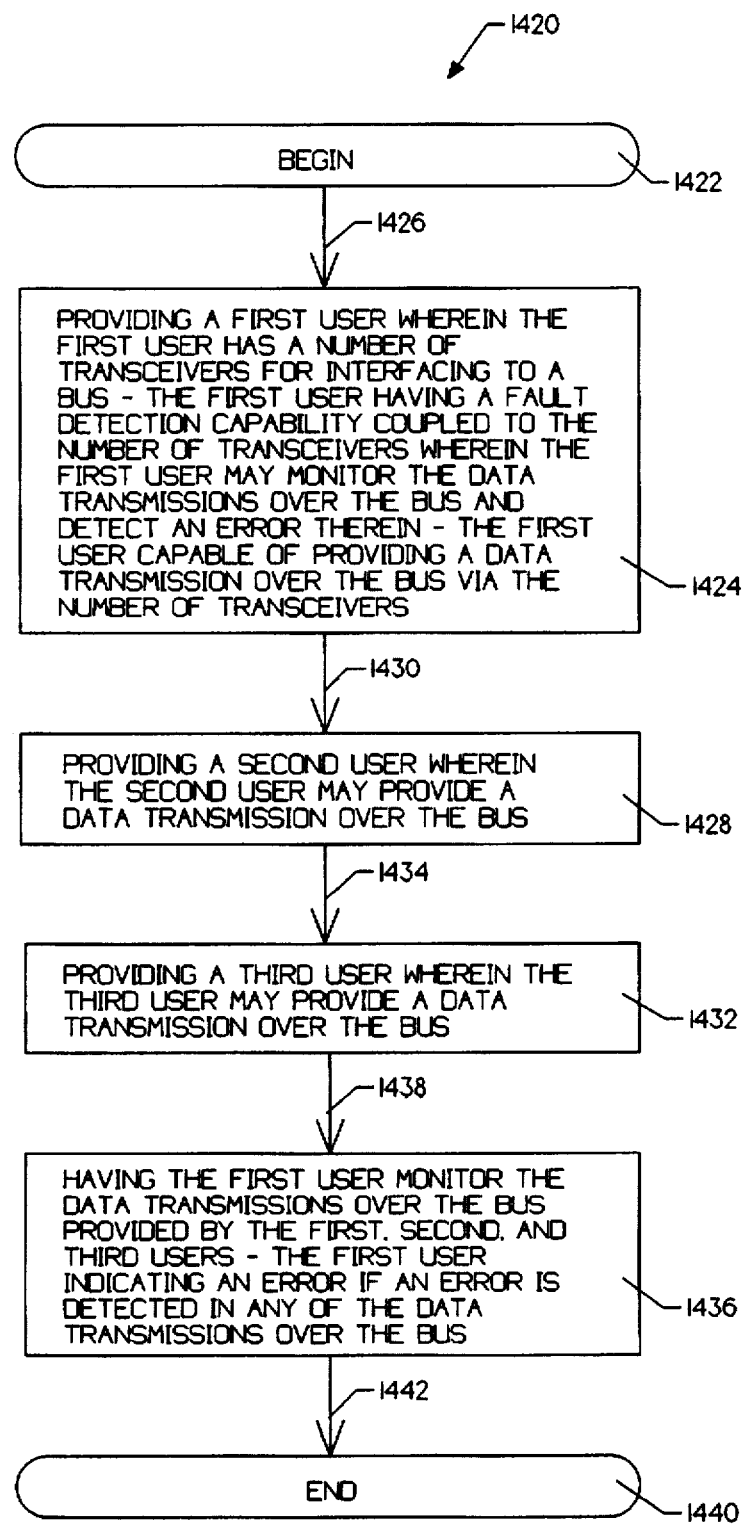
FIG. 17 is a flow diagram showing a second exemplary method of the present invention.

FIG. 17 is a flow diagram showing a second exemplary method of the present invention. The flow diagram is generally shown at 1420. The algorithm is entered at element 1422, wherein control is passed to element 1424 via interface 1426. Element 1424 provides a first user, wherein the first user has a number of transceivers for interfacing with a bus. The first user further having a fault detection capability coupled to the number of transceivers such that the fault detection capability may monitor predetermined data transmissions over the bus and detect an error therein. Further, the first user may have the capability to providing a data transmission over the bus via the corresponding number of transceivers. Control is then passed to element 1428 via interface 1430. Element 1428 provides a second user, wherein the second user may provide a data transmission over the bus. Control is then passed to element 1432 via interface 1434. Element 1432 provides a third user, wherein the third user may provide a data transmission over the bus. Control is then passed to element 1436 via interface 1438. Element 1436 causes the first user to monitor predetermined data transmissions over the bus. The predetermined data transmission may be provided by the first user, the second user, and/or the third user. The first user indicating an error if an error is detected in any of the predetermined data transmissions over the bus. Control is then passed to element 1440 via interface 1442, wherein the algorithm is exited.

Figure 18A:
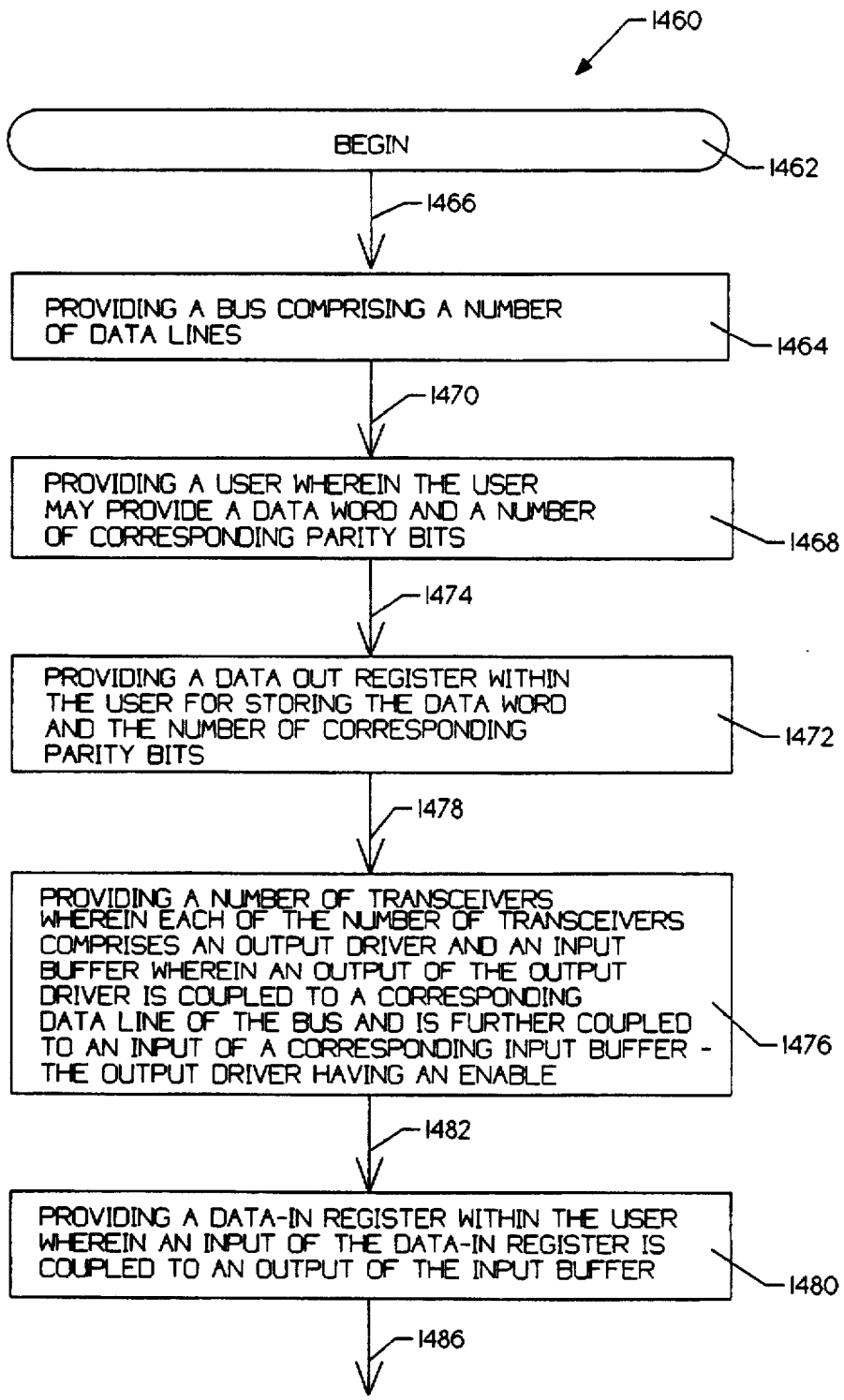
FIG. 18A and FIG. 18B comprise a flow diagram showing a third exemplary method of the present invention.
Figure 18B:
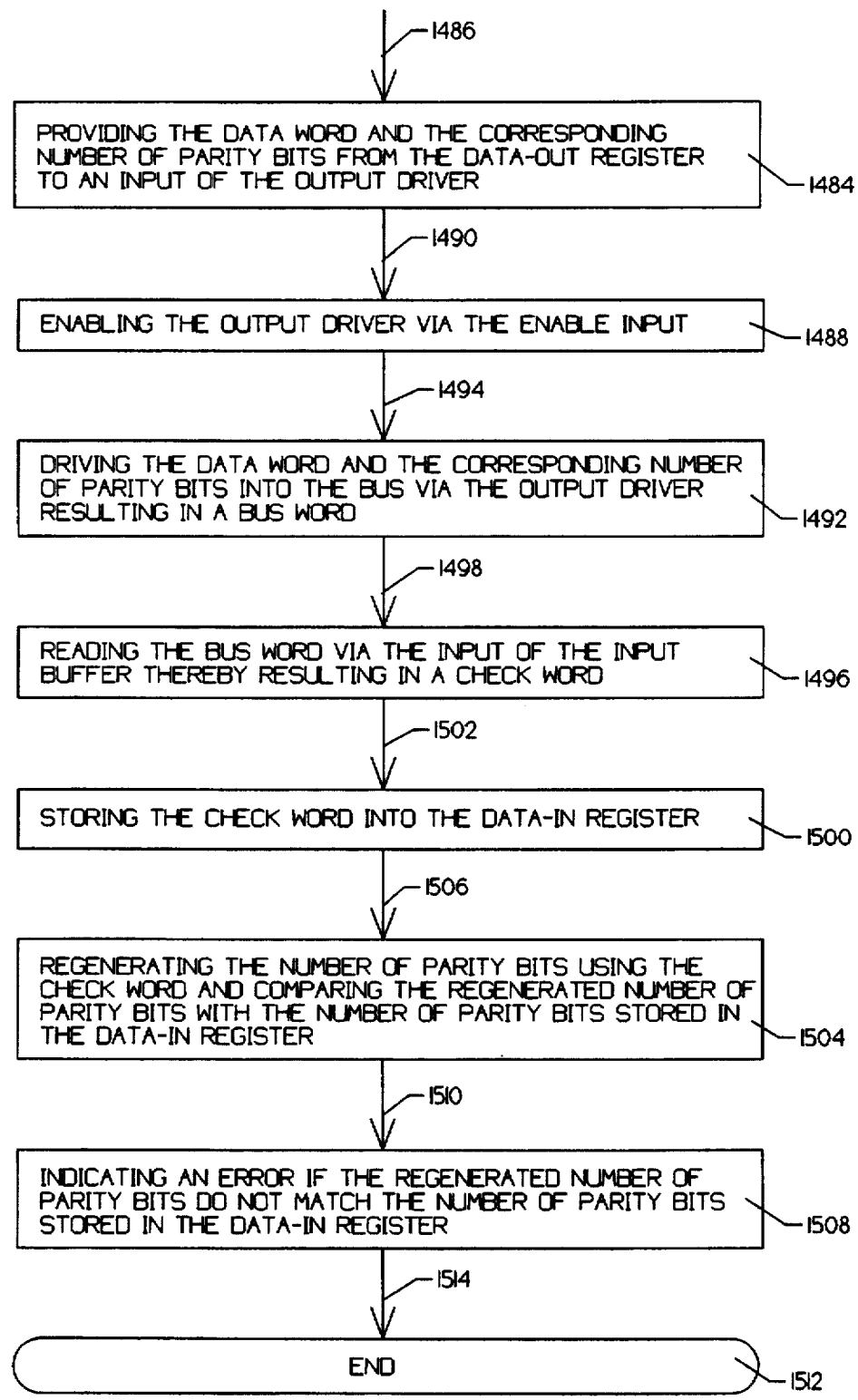

FIG. 18A and FIG. 18B comprise a flow diagram showing a third exemplary method of the present invention. The flow diagram is generally shown at 1460. The algorithm is entered at element 1462, wherein control is passed to element 1464 via interface 1466. Element 1464 provides a bus comprising a number of data lines. Control is then passed to element 1468 via interface 1470. Element 1468 provides a user, wherein the user may provide a data word and a number of corresponding parity bits. Control is then passed to element 1472 via interface 1474. Element 1472 provides a data out register within the user for storing the data word and the number of corresponding parity bits. Control is then passed to element 1476 via interface 1478. Element 1476 provides a number of transceivers, wherein each of the number of transceivers may have an output buffer and an input buffer. An output of the output buffer may be coupled to a corresponding data line of the bus, and may be further coupled to an input of a corresponding input buffer. The output buffer may further have an enable. Control is then passed to element 1480 via interface 1482. Element 1480 provides a data-in register within the user, wherein an input of the data-in register may be coupled to an output of the input buffer. Control is then passed to element 1484 via interface 1486. Element 1484 provides the data word and the corresponding number of parity bits from the data out register to an input of the output buffer. Control is then passed to element 1488 via interface 1490. Element 1488 enables the output buffer via the enable input. Control is then passed to element 1492 via interface 1494. Element 1492 drives the data word and the corresponding number of parity bits onto the bus via the output buffer, thereby resulting in a bus word. Control is then passed to element 1496 via interface 1498. Element 1496 reads the bus word via the input of the input buffer, thereby resulting in a check word. Control is then passed to element 1500 via interface 1502. Element 1500 stores the check word into the data-in register. Control is then passed to element 1504 via interface 1506. Element 1504 regenerates the number of parity bits for the check word, and compares the regenerated number of parity bits with the number of parity bits stored in the data-in register. Control is then passed to element 1508 via interface 1510. Element 1508 indicates an error if the regenerated number of parity bits do not match the number of parity bits stored in the data-in register. Control is then passed to element 1512 via interface 1514 wherein the algorithm is exited.

Figure 19:
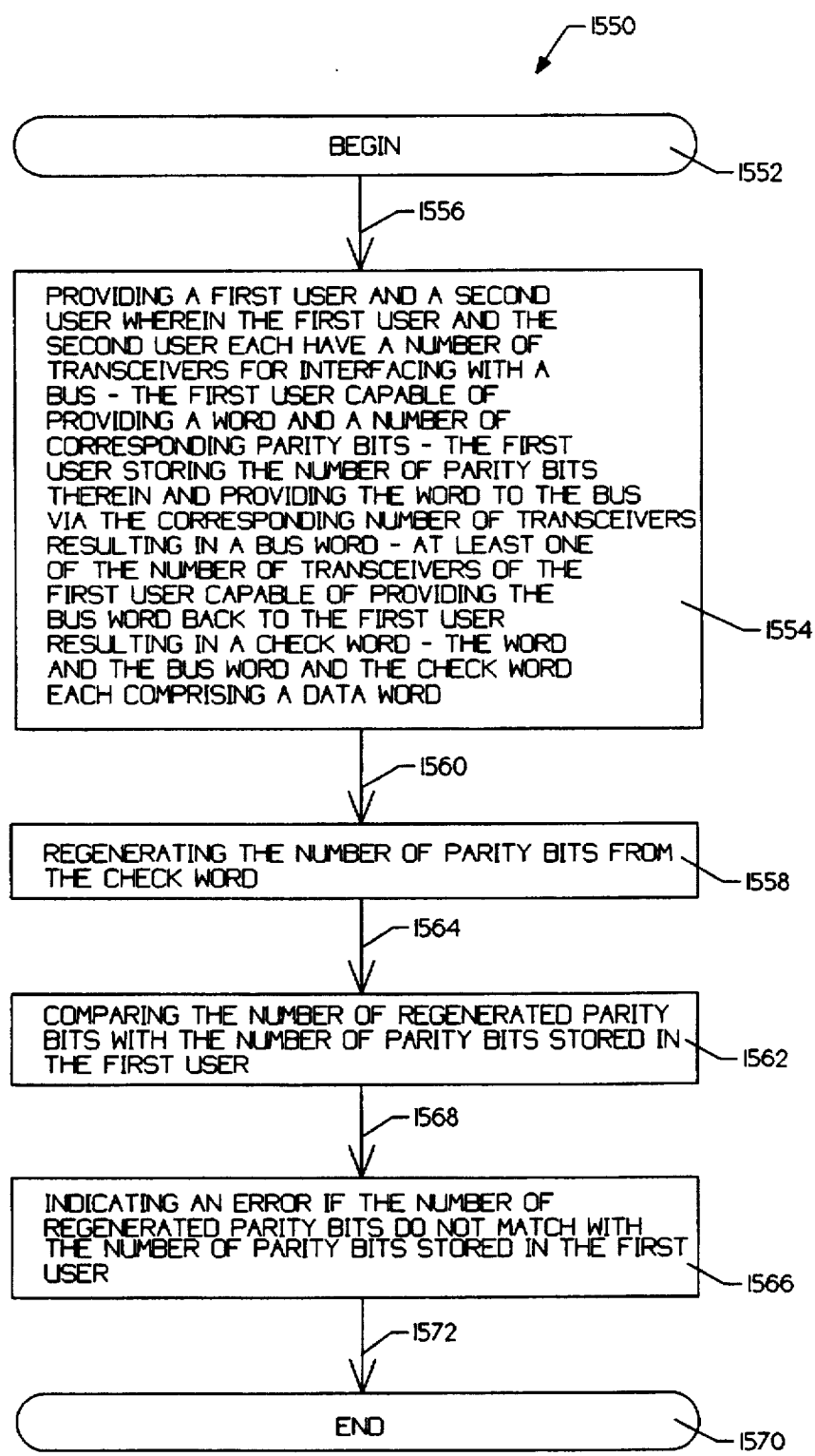
FIG. 19 is a flow diagram showing a fourth exemplary method of the present invention.

FIG. 19 is a flow diagram showing a fourth exemplary method of the present invention. The flow diagram is generally shown at 1550. The algorithm is entered at element 1552, wherein control is passed to element 1554 via interface 1556. Element 1554 provides a first user and a second user, wherein the first user and the second user each have a number of transceivers for interfacing with a bus. The first user being capable of providing a word and a number of corresponding parity bits. The first user providing the word to the bus via the corresponding number of transceivers, thereby resulting in a bus word. The first user storing the number of parity bits therein. At least one of the number of transceivers of the first user being capable of providing the bus word back into the first user, thereby resulting in a check word. Control is then passed to element 1558 via interface 1560. Element 1558 regenerates the number of parity bits from the check word. Control is then passed to element 1562 via interface 1564. Element 1562 compares the number of regenerated parity bits with the number of parity bits stored in the first user. Control is then passed to element 1566 via interface 1568. Element 1566 indicates an error if the number of regenerated parity bits do not match the number of parity bits stored in the first user. Control is then passed to element 1570 via interface 1572, wherein the algorithm is exited.

Figure 20A:
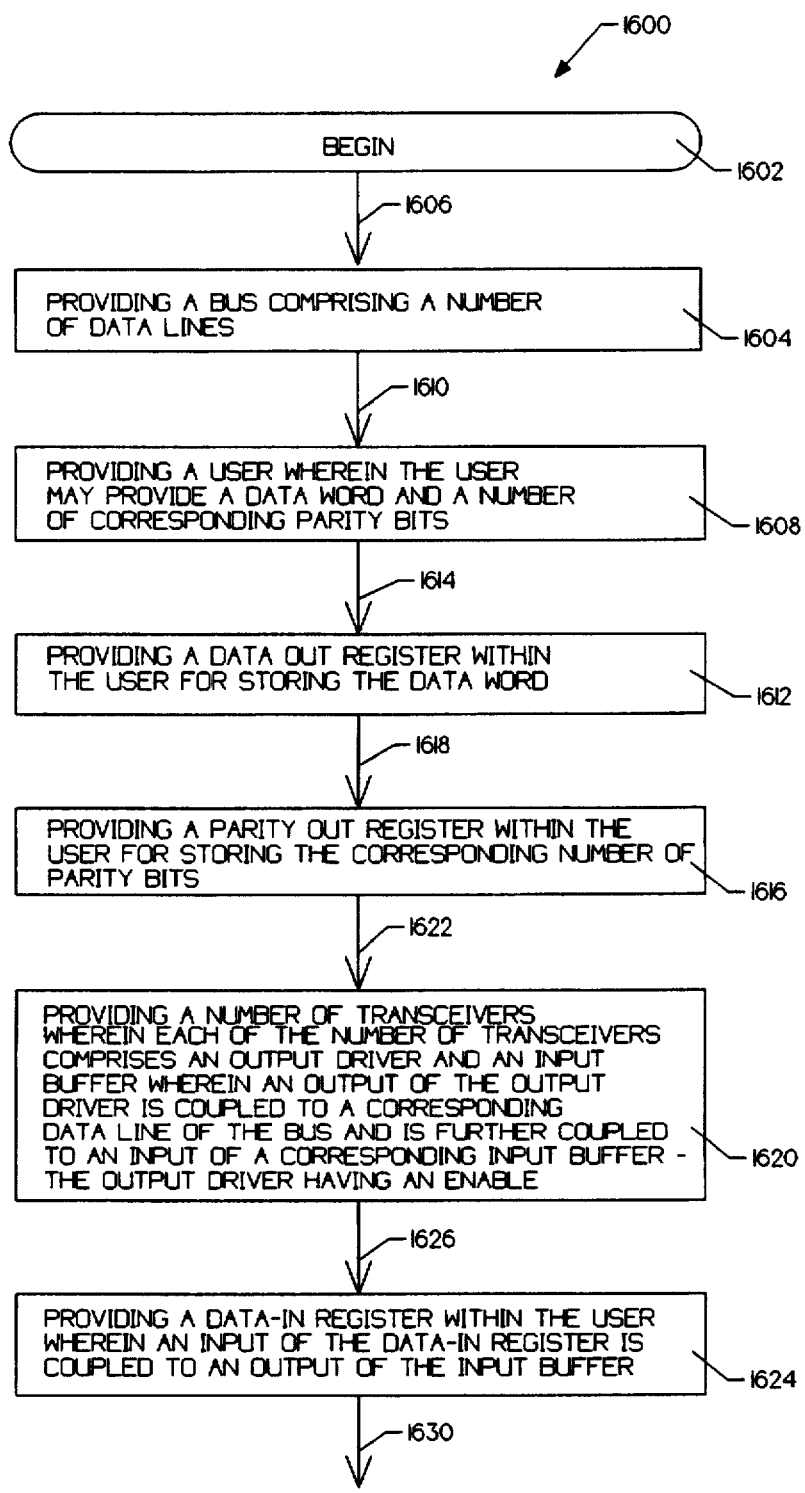
FIG. 20A and FIG. 20B comprise a flow diagram showing a fifth exemplary method of the present invention.
Figure 20B:
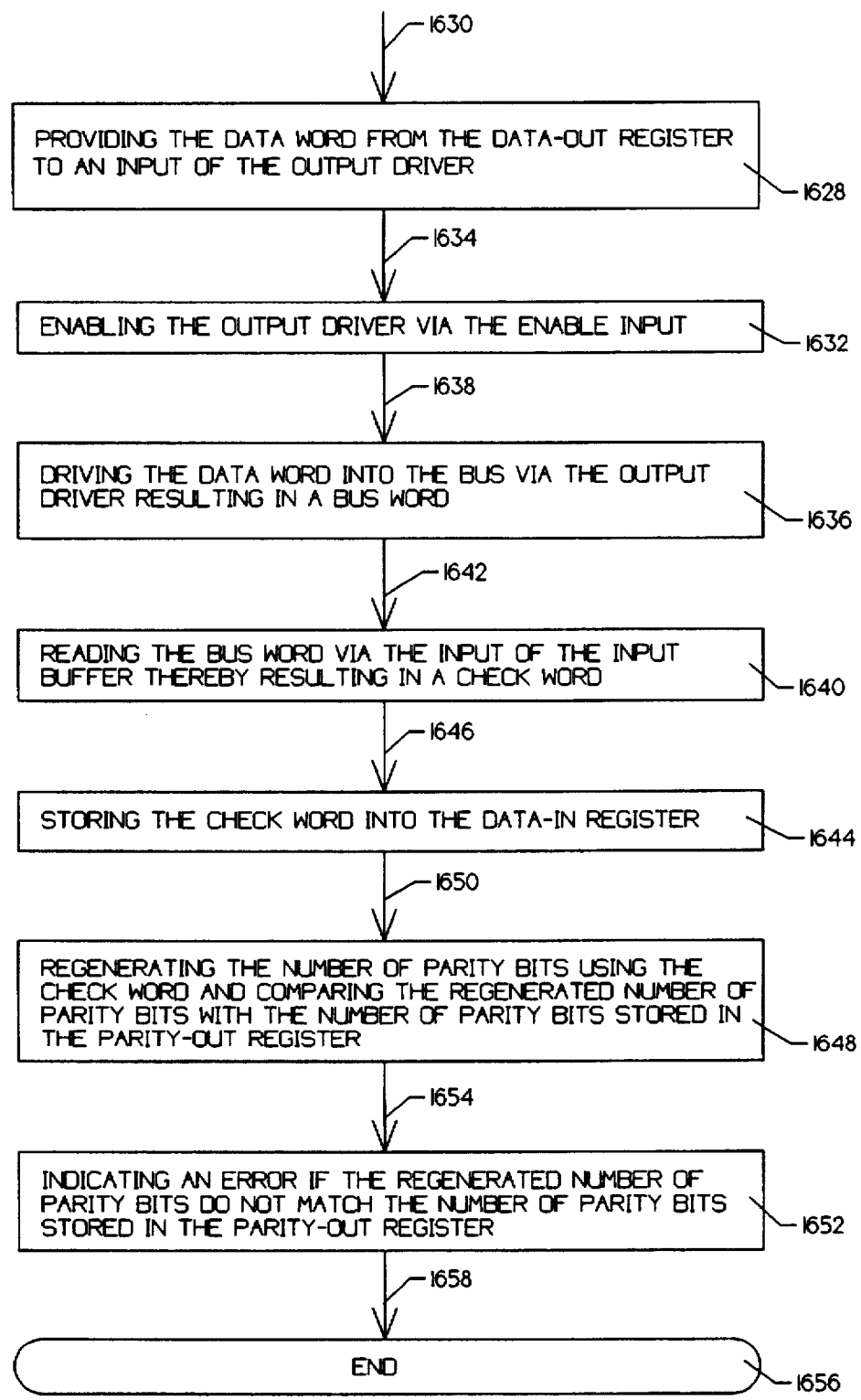

FIG. 20A and FIG. 20B comprise a flow diagram showing a fifth exemplary method of the present invention. The flow diagram is generally shown at 1600. The algorithm is entered at element 1602, wherein control is passed to element 1604 via interface 1606. Element 1604 provides a bus comprising a number of data lines. Control is then passed to element 1608 via interface 1610. Element 1608 provides a user, wherein the user may provide a data word and a number of corresponding parity bits. Control is then passed to element 1612 via interface 1614. Element 1612 provides a data-out register within the user for storing the data word. Control is then passed to element 1616 via interface 1618. Element 1616 provides a parity-out register within the user for storing the corresponding number of parity bits. Control is then passed to element 1620 via interface 1622. Element 1620 provides a number of transceivers, wherein each of the number of transceivers has an output buffer and an input buffer, wherein an output of the output buffer may be coupled to a corresponding data line of the bus and may be further coupled to an input of a corresponding input buffer. Further, the output buffer may have an enable. Control is then passed to element 1624 via interface 1626. Element 1624 provides a data-in register within the user, wherein an input of the data-in register is coupled to an output of the input buffer. Control is then passed to element 1628 via interface 1630. Element 1628 provides the data word from the data-out register to an input of the output buffer. Control is then passed to element 1632 via interface 1634. Element 1632 enables the output buffer via the enable input. Control is then passed to element 1636 via interface 1638. Element 1636 drives the data word onto the bus via the output buffer, thereby resulting in a bus word. Control is then passed to element 1640 via interface 1642. Element 1640 reads the bus word via the input of the input buffer, thereby resulting in a check word. Control is then passed to element 1644 via interface 1646. Element 1644 stores the check word into the data-in register. Control is then passed to element 1648 via interface 1650. Element 1648 regenerates the number of parity bits using the check word and comparing the regenerated number of parity bits with the number of parity bits stored in the parity-out register. Control is then passed to element 1652 via interface 1654. Element 1652 indicates an error if the regenerated number of parity bits do not match the number of parity bits stored in the parity-out register. Control is then passed to element 1656 via interface 1658, wherein the algorithm is exited.

Having thus described the preferred embodiments of the present invention, those of skill in the art will readily appreciate that the teachings found herein may be applied to yet other embodiments within the scope of the claims hereto attached.

We claim:

1. In a data processing system having a plurality of users coupled to a bus, predetermined ones of the plurality of users being capable of providing a data word, the improvement comprising:

a. first providing means coupled to a first one of the plurality of users for providing the data word to the bus thereby resulting in a bus word, said first providing means providing the bus word during a first bus cycle;

b. second providing means coupled to the bus and further coupled to said first one of the plurality of users for providing said bus word back into said first one of the plurality of users thereby resulting in a check word, said second providing means providing said bus word back into said first one of the plurality of users during said first bus cycle; and c. error detection means coupled to said second providing means for performing error detection on said check word.

2. A data processing system according to claim 1 wherein said first providing means comprises a plurality of output buffers.

3. A data processing system according to claim 2 wherein said second providing means comprises a plurality of input buffers.

4. A data processing system according to claim 3 wherein said error detection means comprises a parity error check.

5. In a data processing system having a plurality of users coupled to a bus, predetermined ones of the plurality of users being capable of providing a data word wherein the data word has a data portion and an error detection portion, the improvement comprising:

a. interface means coupled to a corresponding one of the plurality of users for providing an interface between said corresponding user and the bus, said interface means being capable of providing the data word from said corresponding user to the bus thereby resulting in a bus word, and further capable of providing said bus word from the bus back into said corresponding user thereby resulting in a check word, said check word having a data portion and an original error detection portion;

b. regenerating means coupled to said interface means for regenerating said error detection portion of said check word thereby resulting in a regenerated error detection portion;

c. comparing means coupled to said regenerating means for comparing said regenerated error detection portion with said original error detection portion of said check word to determine if a match exists; and d. notifying means coupled to said comparing means for notifying said corresponding user of a fault when said comparing means determines that said match does not exist.

6. A data processing system according to claim 5 wherein said interface means comprises a transceiver block.

7. In a data processing system having a plurality of users coupled to a bus, predetermined ones of the plurality of users being capable of providing a data word wherein the data word has a data portion and an error detection portion, the improvement comprising:

a. a plurality of interface means, each of said plurality of interface means being coupled to a corresponding one of the plurality of users for providing an interface between the plurality of users and the bus, a preselected number of said plurality of interface means being capable of providing the data word from said corresponding user to the bus thereby resulting in a bus word, and further capable of providing said bus word from the bus back into said corresponding user thereby resulting in a check word, said check word having a data portion and an original error detection portion;

b. a plurality of regenerating means coupled to predetermined ones of the plurality of interface means for regenerating said error detection portion of said check word, thereby resulting in a regenerated error detection portion;

c. a plurality of comparing means coupled to said plurality of regenerating means for comparing said regenerated error detection portion with said original error detection portion of said check word to determine if a match exists; and d. a plurality of notifying means coupled to said plurality of comparing means for notifying a corresponding user of a fault when said corresponding comparing means determines that said match does not exist.

8. A data processing system according to claim 5 wherein said interface means comprises a transceiver block.

9. In a data processing system having a plurality of users coupled to a bus, predetermined ones of the plurality of users being capable of providing a data word wherein the data word has a data portion and an error detection portion, the improvement comprising:

a. interface means coupled to a corresponding one of the plurality of users for providing an interface between said corresponding user and the bus, said interface means being capable of providing the data portion of the data word from said corresponding user to the bus thereby resulting in a bus word, and further capable of providing said bus word from the bus back into said corresponding user thereby resulting in a check word, said check word comprising a data portion;
   b. regenerating means coupled to said interface means for regenerating an error detection portion of said check word thereby resulting in a regenerated error detection portion;
   c. comparing means coupled to said regenerating means for comparing said regenerated error detection portion with said error detection portion of said data word, to determine if a match exists; and
   d. notifying means coupled to said comparing means for notifying said corresponding user of a fault when said comparing means determines that said match does not exist.

10. A data processing system according to claim 9 wherein said interface means comprises a transceiver block.

11. In a data processing system having a plurality of users coupled to a bus, predetermined ones of the plurality of users being capable of providing a data word wherein the data word has a data portion and an error detection portion, the improvement comprising:

a. a plurality of interface means, each of said plurality of interface means being coupled to a corresponding one of the plurality of users for providing an interface between the plurality of users and the bus, a preselected number of said plurality of interface means being capable of providing the data portion of the data word from said corresponding user to the bus thereby resulting in a bus word, and further capable of providing said bus word from the bus back into said corresponding user thereby resulting in a check word, said check word comprising a data portion;
   b. a plurality of regenerating means coupled to predetermined ones of the plurality of interface means for regenerating an error detection portion of said check word, thereby resulting in a regenerated error detection portion;
   c. a plurality of comparing means coupled to a plurality of error detection means for comparing said regenerated error detection portion with said error detection portion of said data word, to determine if a match exists; and
   d. a plurality of notifying means coupled to said plurality of comparing means for notifying a corresponding user of a fault when said corresponding comparing means determines that said match does not exist.

12. A data processing system according to claim 11 wherein said interface means comprises a transceiver block.

13. In a data processing system having a plurality of users coupled to a bus, predetermined ones of the plurality of users being capable of providing a data word, the improvement comprising:

a. a first providing circuit coupled to a first one of the plurality of users for providing the data word to the bus thereby resulting in a bus word, said first providing circuit providing the bus word during a first bus cycle;
   b. a second providing circuit coupled to the bus and further coupled to said first one of the plurality of users for providing said bus word back into said first one of the plurality of users thereby resulting in a check word, said second providing circuit providing said bus word back into said first one of the plurality of users during said first bus cycle; and
   c. an error detection circuit coupled to said second providing circuit for performing error detection on said check word.

14. A data processing system according to claim 13 wherein said first providing circuit comprises a plurality of output buffers.

15. A data processing system according to claim 14 wherein said second providing circuit comprises a plurality of input buffers.

16. A data processing system according to claim 15 wherein said error detection circuit comprises a parity error check.

17. In a data processing system having a plurality of users coupled to a bus, predetermined ones of the plurality of users being capable of providing a data word wherein the data word has a data portion and an error detection portion, the improvement comprising:

a. an interface circuit coupled to a corresponding one of the plurality of users for providing an interface between said corresponding user and the bus, said interface circuit being capable of providing the data word from said corresponding user to the bus thereby resulting in a bus word, and further capable of providing said bus word from the bus back into said corresponding user thereby resulting in a check word, said check word having a data portion and an original error detection portion;
   b. a regenerating circuit coupled to said interface circuit for regenerating said error detection portion of said check word thereby resulting in a regenerated error detection portion;
   c. a comparing circuit coupled to said regenerating circuit for comparing said regenerated error detection portion with said original error detection portion of said check word to determine if a match exists; and
   d. a notifying circuit coupled to said comparing circuit for notifying said corresponding user of a fault when said comparing circuit determines that said match does not exist.

18. A data processing system according to claim 17 wherein said interface circuit comprises a plurality of transceivers.

19. In a data processing system having a plurality of users coupled to a bus, predetermined ones of the plurality of users being capable of providing a data word wherein the data word has a data portion and an error detection portion, the improvement comprising:

a. a plurality of interface circuits, each of said plurality of interface circuits being coupled to a corresponding one of the plurality of users for providing an interface between the plurality of users and the bus, a preselected number of said plurality of interface circuits being capable of providing the data word from said corresponding user to the bus thereby resulting in a bus word, and further capable of providing said bus word from the bus back into said corresponding user thereby resulting in a check word, said check word having a data portion and an original error detection portion;

b. a plurality of regenerating circuits coupled to predetermined ones of the plurality of interface circuits for regenerating said error detection portion of said check word, thereby resulting in a regenerated error detection portion;

c. a plurality of comparing circuits coupled to said plurality of regenerating circuits for comparing said regenerated error detection portion with said original error detection portion of said check word to determine if a match exists; and d. a plurality of notifying circuits coupled to said plurality of comparing circuits for notifying a corresponding user of a fault when said corresponding comparing circuit determines that said match does not exist.

20. A data processing system according to claim 19 wherein each of said plurality of interface circuits comprises a plurality of transceivers.

21. In a data processing system having a plurality of users coupled to a bus, predetermined ones of the plurality of users being capable of providing a data word wherein the data word has a data portion and an error detection portion, the improvement comprising:

a. an interface circuit coupled to a corresponding one of the plurality of users for providing an interface between said corresponding user and the bus, said interface circuit being capable of providing the data portion of the data word from said corresponding user to the bus thereby resulting in a bus word, and further capable of providing said bus word from the bus back into said corresponding user thereby resulting in a check word, said check word comprising a data portion;

b. a regenerating circuit coupled to said interface circuit for regenerating an error detection portion of said check word thereby resulting in a regenerated error detection portion;

c. a comparing circuit coupled to said regenerating circuit for comparing said regenerated error detection portion with said error detection portion of said data word, to determine if a match exists; and d. a notifying circuit coupled to said comparing circuit for notifying said corresponding user of a fault when said comparing circuit determines that said match does not exist.

22. A data processing system according to claim 21 wherein said interface circuit comprises a plurality of transceivers.

23. In a data processing system having a plurality of users coupled to a bus, predetermined ones of the plurality of users being capable of providing a data word wherein the data word has a data portion and an error detection portion, the improvement comprising:

a. a plurality of interface circuits, each of said plurality of interface circuits being coupled to a corresponding one of the plurality of users for providing an interface between the plurality of users and the bus, a preselected number of said plurality of interface circuits being capable of providing the data portion of the data word from said corresponding user to the bus thereby resulting in a bus word, and further capable of providing said bus word from the bus back into said corresponding user thereby resulting in a check word, said check word comprising a data portion;

b. a plurality of regenerating circuits coupled to predetermined ones of the plurality of interface circuits for regenerating an error detection portion of said check word, thereby resulting in a regenerated error detection portion;

c. a plurality of comparing circuits coupled to said plurality of regenerating circuits for comparing said regenerated error detection portion with said error detection portion of said data word, to determine if a match exists; and d. a plurality of notifying circuits coupled to said plurality of comparing circuits for notifying a corresponding user of a fault when said corresponding comparing circuit determines that said match does not exist.

24. A data processing system according to claim 11 wherein each of said plurality of interface circuits comprises a plurality of transceivers.

25. An apparatus comprising:

a. a DSDC block coupled to a DSD address bus, said DSDC block further comprising:
   i. an address-out register for storing an address word wherein said address word has an address portion and an error detection portion;
   ii. a transceiver block coupled to said DSD address bus and further coupled to said address-out register for providing said address portion of said address word to said DSD address bus thereby resulting in a bus word, said transceiver block further providing said bus word back into said DSDC block thereby resulting in a check word, said check word comprising an address portion;
   iii. a parity checker block coupled to said transceiver block for regenerating said error detection portion of said check word thereby resulting in a regenerated error detection portion;
   iv. comparing circuit coupled to said checker block for comparing said error detection portion of said address word with said regenerated error detection portion and determining if a match exists; and
   v. notifying means coupled to said comparing circuit for notifying said DSDC block if said comparing circuit determines that said match does not exist.

26. An apparatus comprising:

a. a DSDC block coupled to a DSD address bus, said DSDC block further comprising:
   i. an address-out register for storing an address word wherein said address word has an address portion and an error detection portion;
   ii. a transceiver block coupled to said DSD address bus and further coupled to said address-out register for providing said address portion of said address word to said DSD address bus thereby resulting in a bus word, said transceiver block further providing said bus word back into said DSDC block thereby resulting in a check word, said check word comprising an address portion;
   iii. an address-in register coupled to said transceiver block for storing said check word;
   iv. a parity checker block coupled to said address-in register for regenerating said error detection portion of said check word thereby resulting in a regenerated error detection portion;
   v. comparing circuit coupled to said checker block for comparing said error detection portion of said address word with said regenerated error detection portion and determining if a match exists; and
   vi. notifying means coupled to said comparing circuit for notifying said DSDC block if said comparing circuit determines that said match does not exist.

27. An apparatus comprising:
a. a Data Save Disk Chip (DSDC) block coupled to a Data Save Disk (DSD) data bus, said DSDC block further comprising:
  i. a data-out register for storing a data word wherein said data word has a data portion and an error detection portion;
  ii. a transceiver block coupled to said DSD data bus and further coupled to said data-out register for providing said data word to said DSD data bus thereby resulting in a bus word, said transceiver block further providing said bus word back into said DSDC block thereby resulting in a check word, said check word comprising a data portion and an original error detection portion;
  iii. a parity checker block coupled to said transceiver block for regenerating said error detection portion of said check word thereby resulting in a regenerated error detection portion;
  iv. comparing circuit coupled to said checker block for comparing said error detection portion of said check word with said regenerated error detection portion and determining if a match exists; and
  v. notifying means coupled to said comparing circuit for notifying said DSDC block if said comparing circuit determines that said match does not exist.

28. An apparatus comprising:
a. a Data Save Disk Chip (DSDC) block coupled to a Data Save Disk (DSD) data bus, said DSDC block further comprising:
  i. an data-out register for storing a data word wherein said data word has a data portion and an error detection portion;
  ii. a transceiver block coupled to said DSD data bus and further coupled to said data-out register for providing said data word to said DSD data bus thereby resulting in a bus word, said transceiver block further providing said bus word back into said DSDC block thereby resulting in a check word, said check word comprising a data portion and an original error detection portion;
  iii. a data-in register coupled to said transceiver block for storing said check word;
  iv. a parity checker block coupled to said data-in register for regenerating said error detection portion of said check word thereby resulting in a regenerated error detection portion;
  v. comparing circuit coupled to said checker block for comparing said error detection portion of said check word with said regenerated error detection portion and determining if a match exists; and
  vi. notifying means coupled to said comparing circuit for notifying said DSDC block if said comparing circuit determines that said match does not exist.

29. A method for providing error detection to a bus wherein a first user and a second user are coupled to the bus, the first user and the second user each having a plurality of transceivers for interfacing with the bus, the method comprising the steps of:
a. providing a word to the bus thereby resulting in a bus word, the bus word being provided by the corresponding plurality of transceivers of the first user during a first bus cycle;
b. providing said bus word back into the first user during the first bus cycle via the corresponding plurality of transceivers of the first user, thereby resulting in a check word; and
c. performing error detection on said check word.

30. A method for providing error detection to a bus wherein a first user, a second user, and a third user are coupled to the bus, the first user, the second user, and the third user each having a plurality of transceivers for interfacing with the bus, the first user, the second user, and the third user being capable of providing a plurality of bus transmissions over the bus via the corresponding plurality of transceivers, the method comprising the steps of:
a. providing an error detection capability within the first user, the error detection capability being coupled to the corresponding plurality of transceivers; and
b. monitoring preselected ones of the plurality of bus transmissions between said second user and said third user via said error detection capability in the first user.

31. A method according to claim 30 further comprising the steps of:
c. monitoring preselected ones of the plurality of bus transmissions between said first user and said second user via said error detection capability in the first user.

32. A method according to claim 31 further comprising the steps of:
d. monitoring preselected ones of the plurality of bus transmissions between said first user and said third user via said error detection capability in the first user.

33. A method for providing error detection to a bus wherein a first user and a second user are coupled to the bus, the first user and the second user each having a plurality of transceivers for interfacing with the bus, the method comprising the steps of:
a. providing a data word from the first user wherein said data word comprises a data portion and an error detection portion;
b. providing said data word to the bus via the corresponding plurality of transceivers, thereby resulting in a bus word;
c. providing said bus word back into said first user via the corresponding plurality of transceivers thereby resulting in a check word, said check word comprising a data portion and an error detection portion;
d. regenerating an error detection portion of said check word thereby resulting in a regenerated error detection portion;
e. comparing said regenerated error detection portion with said error detection portion of said check word, to determine if a match exists; and
f. notifying the first user of a fault if said comparing step (e) determines that said match does not exist.

34. A method for providing error detection to a bus wherein a first user and a second user are coupled to the bus, the first user and the second user each having a plurality of transceivers for interfacing with the bus, the method comprising the steps of:
a. providing a data word from the first user wherein said data word comprises a data portion and an error detection portion;
b. providing said data portion of said data word to the bus via the corresponding plurality of transceivers, thereby resulting in a bus word;
c. providing said bus word back into said first user via the corresponding plurality of transceivers thereby resulting in a check word, said check word comprising a data portion;
d. regenerating an error detection portion of said check word thereby resulting in a regenerated error detection portion;

e. comparing said regenerated error detection portion with said error detection portion of said data word, to determine if a match exists; and f. notifying the first user of a fault if said comparing step (e) determines that said match does not exist.

35. A method for providing error detection to a bus wherein a first user, a second user, and a third user are coupled to the bus, the first user capable of monitoring the bus, the second user and the third user being capable of providing a plurality of bus transmissions over the bus, the method comprising the steps of:

a. providing an error detection capability within the first user;

b. monitoring preselected ones of the plurality of bus transmissions between said second user and said third user via said error detection capability in the first user; and c. monitoring preselected ones of the plurality of bus transmissions between said first user and said second user via said error detection capability in the first user.

36. A method according to claim 35 further comprising the steps of:

c. monitoring preselected ones of the plurality of bus transmissions between said first user and said third user via said error detection capability in the first user.

* * * * *